US012806974B2

(12) United States Patent
MacDougall

(10) Patent No.: US 12,806,974 B2
(45) Date of Patent: Nov. 24, 2026

(54) DEBRIS DEFLECTORS AND METHODS OF SHIELDING A DEFINED VEHICLE SURFACE REGION

(71) Applicant: Todd MacDougall, Fort McMurray (CA)

(72) Inventor: Todd MacDougall, Fort McMurray (CA)

( * ) Notice: Subject to any disclaimer, the term of this patent is extended or adjusted under 35 U.S.C. 154(b) by 333 days.

(21) Appl. No.: 18/439,273

(22) Filed: Feb. 12, 2024

(65) Prior Publication Data

US 2024/0270057 A1 Aug. 15, 2024

(30) Foreign Application Priority Data

Feb. 13, 2023 (CA) ................................ CA 3189481

(51) Int. Cl.
*B60J 1/20* (2006.01)

(52) U.S. Cl.
CPC ................................... *B60J 1/2005* (2013.01)

(58) Field of Classification Search
CPC ............................... B60J 1/2005; B60R 13/04
See application file for complete search history.

(56) References Cited

U.S. PATENT DOCUMENTS 2,933,344 A 4/1960 Shumaker
3,008,756 A 11/1961 Lindhardt
3,799,603 A 3/1974 Bott
5,094,497 A * 3/1992 Hartung ................. B60J 1/2005 296/180.1
5,348,363 A * 9/1994 Fink ....................... B60J 1/2005 296/180.1
6,547,305 B1 * 4/2003 Ellis ....................... B60J 1/2005 296/97.9

(Continued)

FOREIGN PATENT DOCUMENTS

JP 2020001425 A 2/2023
WO WO-2007039169 A1 * 4/2007 ............... B64C 1/14

OTHER PUBLICATIONS

"Bug Deflectors", Action Trucks, Oct. 2022, retrieved from Internet at URL: <https://www.actiontrucks.com/bug-deflectors>.

(Continued)

*Primary Examiner* — Lori Lyjak
(74) *Attorney, Agent, or Firm* — Gray Ice Higdon

(57) ABSTRACT

Described are various embodiments of a debris deflector for shielding a defined vehicle surface region of a vehicle from airborne debris during travel. The debris deflector comprises a resilient deflector body, comprising at least an attachment panel, at least a portion of which is configured to correspond with a vehicle surface, and a shielding panel, at least a portion of which is configured to extend away from the vehicle surface when the attachment panel is attached thereto. The debris deflector further comprises an attachment mechanism provided on the attachment panel for attaching the debris deflector to the vehicle at a position forward of the defined vehicle surface region, so as to prevent the airborne debris from coming into contact with the defined vehicle surface region. Also described are various methods for shielding a defined vehicle surface region from vehicle-adherable airborne debris during travel, and various related kits.

17 Claims, 10 Drawing Sheets

(56) References Cited

U.S. PATENT DOCUMENTS

| | | | | |
|---|---|---|---|---|
| 7,028,797 | B2 * | 4/2006 | White | B60R 19/52 160/DIG. 1 |
| 10,328,858 | B1 * | 6/2019 | Beckward | B60J 1/2002 |

OTHER PUBLICATIONS

"Dent Prevent Car Door Protector", Amazon, Oct. 2022, retrieved from Internet at URL: <https://www.amazon.ca/Removable-Magnetic-Protector-Extendable-Scratches/dp/B07L43Q23M>.

"Side Window Deflectors", WeatherTech, Oct. 2022, retrieved from Internet at URL: <https://www.weathertech.ca/en/side-window-deflectors/?gclid=Cjw...VNgkeYcShtF42h7OzbEsC5ktx_zLeE2fQ8PF_5HtJkCbQX6KcxoCjDgQAvD_Bw>.

* cited by examiner

DEBRIS DEFLECTORS AND METHODS OF SHIELDING A DEFINED VEHICLE SURFACE REGION

CROSS REFERENCE TO RELATED APPLICATIONS

This application claims priority to Canadian Patent Application No. 3,189,481, filed on Feb. 13, 2023, the entire disclosure of which is hereby incorporated herein by reference.

FIELD OF THE DISCLOSURE

The present disclosure relates to vehicle accessories and in particular, to debris deflectors and methods of shielding a defined vehicle surface region of a vehicle from airborne debris during travel.

BACKGROUND

Debris accumulates on vehicle exteriors over time, particularly when travelling during or after rain or similar adverse weather conditions. Road debris can be raised by the rotating tires of the vehicle itself, or of other vehicles driving in proximity to the vehicle in question.

Mud flaps, also known as mud guards or splash guards, protect vehicles by deflecting road debris away from the fender wells and/or walls of the vehicle. Mud flaps are generally rectangular sheets that hang from the rear wheel arch, manufactured of rubber or flexible plastic. Other mud flap designs provide protection along the side rim of the vehicle.

Wind deflectors are used to channel air flow away from the vehicle body, by causing an outward draft over the wind deflector which redirects rain or dirt away from the vehicle. Wind deflectors used on side windows, also known as wind visors, are known to reduce wind noise whilst the vehicle is travelling at speed. Various other categories of wind deflectors are available, ranging from sunroof wind deflectors to hood deflectors, the latter shielding the hood and/or windshield from stone chips and/or bugs during travel.

Dent protectors can be adhered to the side of a vehicle with magnetic strips, to prevent dents to the vehicle body and/or scratches to the vehicle paint, caused by shopping trolly collisions, other car doors opening or the like. Dent protectors typically have a flexible elongate body which is removably adherable to metallic vehicle doors via the magnetic strip.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a debris deflector and/or a method of shielding a defined vehicle surface region of a vehicle that overcome some of the drawbacks of known techniques, or at least, provide a useful alternative thereto. Some aspects of this disclosure provide examples of such a debris deflector and a method of shielding a defined vehicle surface region of a vehicle, as well as related kits.

In accordance with one aspect, there is provided a debris deflector for shielding a defined vehicle surface region of a vehicle from airborne debris during travel. The debris deflector comprises a resilient deflector body which comprises at least: an attachment panel, at least a portion of which is configured to correspond with a vehicle surface; and a shielding panel, at least a portion of which is configured to extend away from the vehicle surface when the attachment panel is attached thereto. The debris deflector further comprises an attachment mechanism provided on the attachment panel for attaching the debris deflector to the vehicle at a position forward of the defined vehicle surface region, so as to prevent the airborne debris from coming into contact with the defined vehicle surface region.

In one embodiment, the shielding panel and the attachment panel are connected to one another at 90 degrees or less.

In one embodiment, the shielding panel and the attachment panel are of unitary construction.

In one embodiment, the shielding panel defines a curvature along its length.

In one embodiment, the shielding panel forms any one of: an obtuse angle, a right angle, an arcuate shape or the like, along its leading edge.

In one embodiment, the curvature is located such that the shielding panel shields the defined vehicle surface region at both a front side and a lower side, in use.

In one embodiment, the shielding panel is substantially elongate for attachment to the vehicle in a substantially vertical orientation.

In one embodiment, the attachment panel is flexible to conform to a contour of the vehicle surface.

In some embodiments, the defined vehicle surface region comprises any one of: a side panel, a side door, a side window, a door handle, an air vent, a side advertising panel, or a hazmat placard, or the like, of the vehicle.

In one embodiment, the attachment mechanism comprises a pressure-sensitive non-permanent adhesive, or the like.

In some embodiments, any one or both of: the shielding panel and the attachment panel, is manufactured of polycarbonate or rubber.

In one embodiment, the defined vehicle surface region comprises a decal applied thereto.

In one embodiment, the airborne debris comprises vehicle-adherable road debris. In one embodiment, the vehicle-adherable road debris would at least partially conceal the decal upon adhering thereto.

In one embodiment, the debris deflector further comprises a vehicle surface overlay panel positioned behind the shielding panel and forming the defined vehicle surface region to be shielded.

In accordance with another aspect, there is provided a method of shielding a defined vehicle surface region of a vehicle from vehicle-adherable airborne debris during travel. The method comprises attaching a debris deflector, having at least a shielding panel, by means of an attachment mechanism to the vehicle, at a position forward of the defined vehicle surface region to be shielded, such that the vehicle-adherable airborne debris is prevented from coming into contact with the defined vehicle surface region during travel of the vehicle.

In one embodiment, attaching the debris deflector comprises adhering the debris deflector to the vehicle by means of either a pressure-sensitive non-permanent adhesive or a permanent adhesive.

In one embodiment, the method comprises a preliminary step of orientating the debris deflector in a substantially vertical orientation in front of the defined vehicle surface region.

In some embodiments, the defined vehicle surface region comprises any one of: a side panel, a side door, a side window, a door handle, an air vent, a side advertising panel, or a hazmat placard, or the like, of the vehicle.

In one embodiment, the defined vehicle surface region comprises a decal applied thereto, and the vehicle-adherable debris would at least partially conceal the decal upon adhering thereto.

In one embodiment, the debris deflector used in the method comprises a debris deflector as described above, with reference to any embodiment of the first aspect of the disclosure.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

Figure 1:
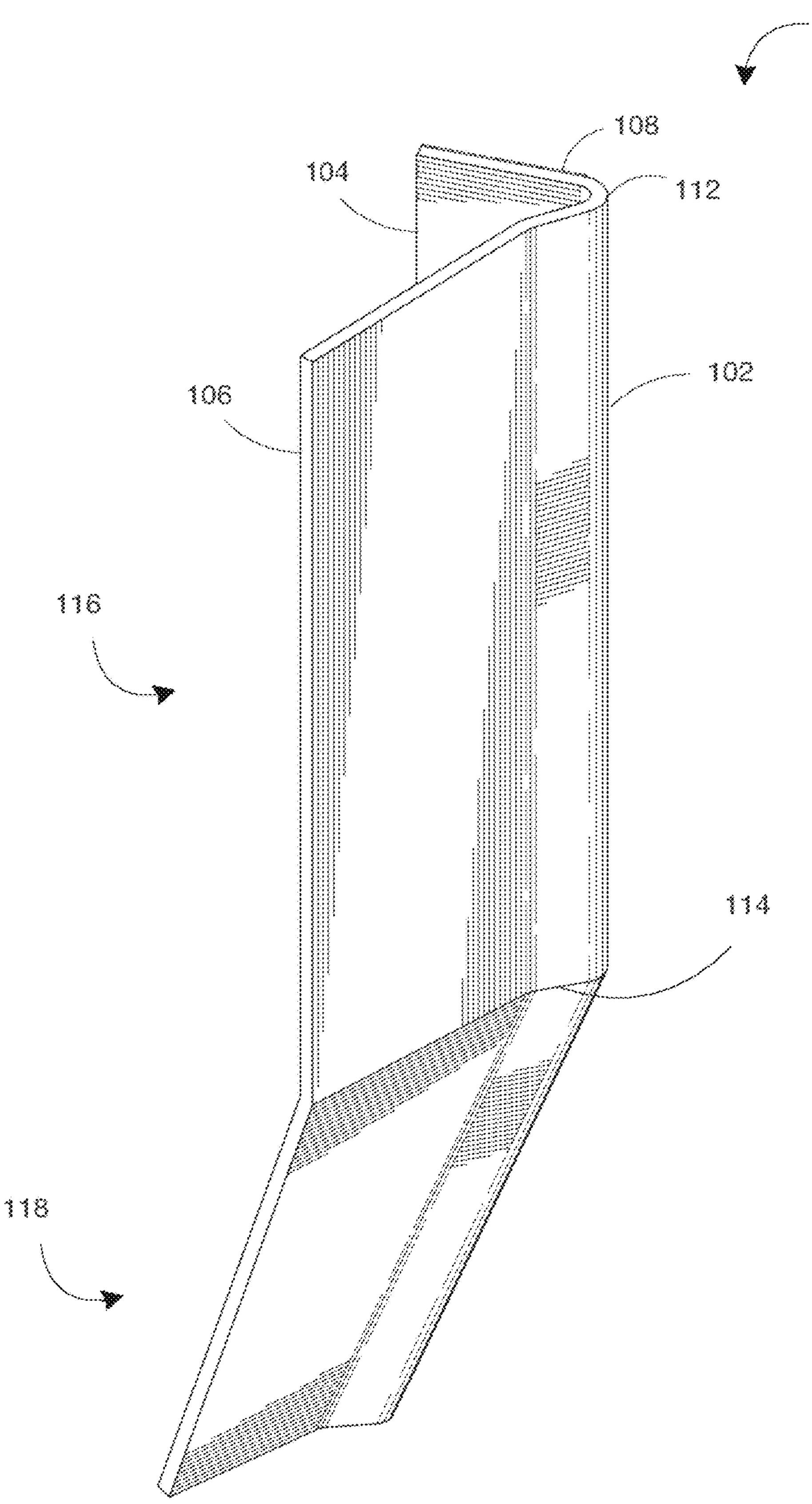
FIG. 1 is a side perspective view of a debris deflector, in accordance with one embodiment, having an attachment panel and a shielding panel, as well as a curvature along the length thereof.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the device(s), method(s) and/or kit(s) disclosed herein. No implementation described below limits any claimed implementation and any claimed implementations may cover device(s), method(s) or kit(s) that differ from those described below. The claimed implementations are not limited to device(s), method(s) or kit(s) having all of the features of any one device, method or kit described below or to features common to multiple or all of the device(s), method(s) or kit(s) described below. It is possible that a device, method or kit described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Unless defined otherwise, all technical and scientific terms used herein have the same meaning as commonly understood by one of ordinary skill in the art to which this disclosure belongs.

Throughout the specification and claims, the following terms take the meanings explicitly associated herein, unless the context clearly dictates otherwise. The phrase "in one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references unless the context clearly dictates otherwise. The meaning of "in" includes "in" and "on."

The term "comprising" as used herein will be understood to mean that the list following is non-exhaustive and may or may not include any other additional suitable items, for example one or more further feature(s), component(s) and/or element(s) as appropriate.

In this specification, the term "debris" is to be interpreted broadly to refer to any debris that a vehicle may be exposed to during use and/or travel. In some embodiments, as the context will indicate, the term "debris" may refer to road debris which is present on a road surface travelled by vehicles, and which may become airborne by forces exerted by the vehicle itself and/or another vehicle (for example, in front of the vehicle in question). In some embodiments, the debris may not be caused by forces exerted by the vehicle and may include, for example, airborne debris such as ash, insects, rain, sleet, snow, or the like. The road surface may be a tarmac road, a concrete road, a paved road, a dirt road, an unmarked road (offroad) or the like, without limitation. To provide a few non-limiting examples, the road debris envisaged may comprise: mud, rocks, gravel, sludge, ice, snow, sleet, salt, water, petroleum products, oil, dirt, dust, grime or the like. In some embodiments, the term "debris" may include, in addition or in the alternative to road debris, air debris which is present in the environment travelled by vehicles. To provide a few non-limiting examples, the air debris envisaged may comprise: rain, hail, snow, bugs, dust, soot, or the like. In some embodiments, the debris may adhere to the vehicle and/or may cause damage to the vehicle, including structural and/or visual or aesthetic damage or impairment.

In this specification, the term "deflector" is to be interpreted as a component and/or device which deflects debris, or otherwise provides a surface on which debris may adhere, thereby preventing the debris from coming into contact with a predefined surface, as will become readily apparent from the remainder of the specification. Notably, the term "deflector" is not intended to be restricted to any component or device requiring active deflection of debris.

In this specification, unless the context indicates otherwise, the term "decal" is intended to cover any label, sticker, logo, artwork, warning, indicia, advertising, reflective tape, or other visible region on a surface of the vehicle, or the like, which is applied or otherwise attached to a vehicle or a part connected thereto. The decal is typically intended to be externally visible to passersby and/or other vehicle users, although need not be, and may be applied to the vehicle by means of adhesive, fasteners, or the like, without limitation. To provide a few non-limiting examples, a decal may be a company logo or identifier, a hazardous material (hazmat) placard, a strip of reflective tape on a long trailer, or the like.

The term "travel" is used in this specification to loosely describe movement of a vehicle in a forward direction, unless the context specifically indicates otherwise.

Changing weather and/or road conditions means that debris inevitably adheres to all parts of vehicles, particularly when travelling on dirt roads, or when travelling through rain or snow. Debris which adheres to vehicle surfaces frequently covers displayed information, whether in the form of decals, placards, reflective tape or the like, and can lead to the information being obscured or concealed, reducing the visibility thereof. Heavy debris, such as airborne stones, can sometimes cause chipping of this displayed information, further reducing the visibility thereof.

In certain industries, including transport, construction and/or mining industries, including oil and gas, it is often mandatory to have certain information displayed and visible on vehicles, and/or to have specific regions of the surface of a vehicle remain visible at all or specific times. For example, large-scale construction and/or mining sites typically require contractors and/or subcontractors to display suitable vehicle identifiers at all times, for various purposes, including to ensure that the driver can be readily identified should the vehicle need to be moved, to aid in identifying vehicles that do not have authorization to be in a certain area, and/or to facilitate the reporting of vehicles that violate any driving infractions. In this regard, it should be kept in mind that the majority of work/fleet trucks in these industries have similar paint colouring (typically white, grey or black), and many vehicles are manufactured by the same manufacturer (for example, on some sites, the top three leading vehicle manufacturers may be FORD™, GMC™ and Chevrolet™). The similarity of vehicle colouring and/or design means that vehicle identification clarity is necessary or at least desirous, particularly for the aforementioned objectives. To achieve this, contractor company logos are usually applied as decals to side doors and in some instances, vehicle unit numbers (similar to a license place or SemiDoT™ numbers but corresponding with all the applicable information pertaining to each vehicle) are usually applied to vehicle front fenders and/or rear tale gates. Contractor company logos and/or vehicle unit numbers should therefore be visible at all times on site.

To provide another example, in Canada, when transporting dangerous goods, hazmat or transportation of dangerous goods (TDG) placards must be displayed on each side and on each end of the means of containment (MOC). This may be required by law or regulation in Canada and similar requirements may be stipulated in other jurisdictions. To provide yet a further example, commercial transportation vehicles are required by law to clearly display certain identification information at all times that the vehicle is in use. Although jurisdictional variations exist, typically this information includes the legal name of the company operating the commercial vehicle, regulation numbers preceded by the appropriate identifier (for example, "USDOT" for the United States, "DOT" for Canada), vehicle number and trailer number.

Conventionally, drivers or operators keep display information and/or surfaces clean and visible by periodically washing the displayed information at gas/fuel stations or weigh stations, using a cleaning tool (for example, a squeegee, brush or other wiper) and cleaning materials (for example, a detergent solution). On construction or mining sites, contractor companies provide various cleaning stations specifically equipped for this purpose around the site and at the offices. Although cleaning stops are effective and commonplace, repeated stops can be time-consuming and the result thereof can be undone within a space of minutes when, for example the vehicle travels further on a muddy dirt road. Furthermore, usage of such cleaning techniques, either due to repeated cleanings over a prolonged period of time or from a single or small number of cleanings, causes irreparable harm to the displayed information, particularly when displayed via a decal or another sticker-type means. Over time, this wear and tear causes the edges of the decal or sticker to lift, causing even further damage to the displayed information over time. The damage caused is exacerbated when daily cleaning is required for regulatory reasons, especially in areas prone to rain and mud, as well as when abrasive cleaning tools and/or harsh cleaning materials are used. Excessive or damaging cleaning also increases the risk of scratching the decal and/or the vehicle paint, especially as particulate matter is wiped backwards and forwards over the vehicle surface during cleaning. Display information, and specifically decals which have deteriorated are typically replaced annually. although sometimes multiple times per year, requiring further expenditure.

In other industries, such as passenger transport by means of motor coaches, transit buses, school buses, airport shuttle buses or the like, visibility out of bus windows is desirous, as well as visibility of bus identifiers and bus advertising. Bus surfaces are typically covered in a fine dust or dirt, and are sometimes covered with mud, which inhibits visibility. Bus drivers can clean these surfaces when at the bus depot but stopping for cleaning during runs is typically impossible and may result in damage to the surface requiring visibility.

There has thus been a longstanding need for a means to prevent debris accumulation on vehicle display information and/or to avoid damage to the display information caused by debris and/or excessive or harsh cleaning.

Several types of vehicle accessories are available to divert debris away from a vehicle, or otherwise protect the vehicle from debris, broadly including mud flaps, window visors and hood deflectors. Dent protectors, on the other hand, prevent dents or scratches to the vehicle body but do not provide any debris protection, except possibly directly underneath the dent protector. However, none of these vehicle accessories recognize the need, in some instances, to protect or otherwise deflect debris from a defined vehicle surface region on a side or, in some embodiments, the top of a vehicle. The defined vehicle surface region may include, may be or may have on it a decal or other indicator, or otherwise may be a vehicle window, a vehicle door handle, a vehicle air vent or a side advertising panel, to provide but a few examples. None of the existing vehicle accessories known to the inventor at this time recognize the need to protect such defined vehicle surface regions, particularly from vehicle-adherable debris or vehicle-damaging debris, nor indeed are any of the existing vehicle accessories workable for such protection.

Mud flaps have a construction which renders them impractical for adherence to the side of a vehicle, and indeed would result in poor aerodynamics, to name but a few limitations. Window visors and hood deflectors are typically elongate accessories requiring in-channel installation. Although some window visors and hood deflectors use automotive adhesive to adhere to vehicles, these accessories are intended to be installed horizontally, having only a thin strip of automotive adhesive on a narrow base, which withstands the weight of the accessory in a horizontal orientation. This adhesive application may be unlikely to withstand the weight of the same accessory when installed in a vertical orientation, with the weight of gravity overcoming the adhesive force between the automotive adhesive and vehicle surface. Generally, window visors and hood deflectors are of a length which would not be suited to installation on the side of a vehicle, particularly in a vertical orientation (and as required in some embodiments, on vehicle doors). Furthermore, based on the intended application of window visors and hood deflectors, these accessories have a relatively low profile and therefore, even if modified to be installed on the side of a vehicle, these accessories would likely fail to protect sufficient vehicle surface area or region from debris. Indeed, modern hood deflectors are designed for flush-mounting with the hood of a vehicle, thus rendering such accessories useless for the purpose of protecting specific areas of interest on a vehicle and/or larger side vehicle surface areas or regions.

Yet further, many vehicle accessories lack the resiliency and/or durability necessary for installation on the side of a vehicle, and the relatively high level of debris impact expected in this application. For example, a window visor, designed to receive impact from wind and/or rain, would not necessarily readily withstand repeated exposure to debris and particularly, heavy debris (for example, gravel). To provide another example, a hood deflector, designed to receive impact from wind, bugs and/or small chips, would also not necessarily readily withstand such repeated exposure.

Even further, it should be appreciated that window visors and hood deflectors are designed to deflect the majority of debris, and are not intended to accumulate, for example, mud, slush or ice thereon. Accordingly, such vehicle accessories may lack the material or mechanical strength or robustness to support accumulated debris, especially when such debris accumulates over time on the side of the vehicle. This may be attributed to the accessory design itself, the material(s) used to manufacture the accessory, and/or the automotive adhesive used, for example.

Based on at least the foregoing, the various prior art accessories for vehicles may be unsuitable for the need(s) disclosed herein, and/or the features thereof may be inconsistent and/or unnecessary to address such need(s).

Accordingly, there may be a need for a debris deflector which can be attached to the side of the vehicle, in front or ahead of a defined vehicle surface region to be shielded from debris. Such a debris deflector may need to be specifically shaped and/or dimensioned to be attached to a side of a vehicle. In some embodiments, the material of the deflector and/or the attachment mechanism may facilitate different shape configurations of the vehicle at the place of attachment, which for most vehicles will be on a location forward, relative to the direction of travel, of the defined region of interest to be protected. Such a debris deflector may need to be sufficiently robust and/or resilient, to withstand prolonged exposure to debris and potential accumulation of debris thereon. Some embodiments of the debris deflector may further need to withstand drag forces caused by higher travel speeds, without detaching from the vehicle surface.

Therefore, the devices, methods and kits described herein provide, in accordance with different embodiments, different examples which identify, ameliorate and/or address the need(s) described above. Indeed, the devices in some embodiments provide a debris deflector for shielding a defined vehicle surface region of a vehicle from airborne debris during travel, thereby preventing the airborne debris from coming into contact with the defined vehicle surface region and/or adhering thereto, thereby potentially obscuring, concealing or covering this region, as will be described below. The methods provide a similar mechanism for shielding the defined vehicle surface region, and the kits include one or more debris deflectors (with other components, in different embodiments) for similar usage.

With reference to FIGS. 1 to 4, and in accordance with one exemplary embodiment, a debris deflector, generally referred to using the numeral 100, will now be described. The debris deflector 100 is for shielding a defined vehicle surface region of a vehicle from airborne debris during travel of the vehicle. The defined vehicle surface region (see FIG. 4) may be any vehicle region defined by a user, which is to be shielded from debris and in particular, from vehicle-adherable debris.

As shown in FIG. 1, the debris deflector 100 comprises a resilient deflector body 102, which in turn comprises at least an attachment panel 104 and a shielding panel 106. In this embodiment, at least a portion of the attachment panel 104 is configured to correspond with a vehicle surface of the vehicle and at least a portion the shielding panel 106 is configured to extend away from the vehicle surface when the attachment panel 104 is attached thereto. The debris deflector 100 further comprises attachment mechanism 108 provided on the attachment panel 104 for attaching the debris deflector 100 to the vehicle at a position forward of the defined vehicle surface region, so as to prevent the airborne debris from coming into contact with (and potentially adhering to) the defined vehicle surface region. Notably, any directional descriptors used herein are typically with reference to the vehicle itself.

In this embodiment, as noted above, at least a portion the shielding panel 106 extends away from the vehicle surface when the attachment panel 104 is attached thereto. In this particular embodiment, the shielding panel 106 extends away from the vehicle surface along its entire length. The shielding panel 106 specifically extends away from the attachment panel 104 at an angle, so as to ensure that the shielding panel 106 is sufficiently aerodynamic with reference to the vehicle body, to avoid excess drag force whilst still sufficiently shielding the defined vehicle surface area from debris.

It is to be appreciated that the width of the shielding panel 106 (or height thereof, with reference to the vehicle surface) will determine the amount of shielding or protection provided by the debris deflector 100 to the defined vehicle surface region, and therefore may be variable amongst different embodiments. Furthermore, the shape of the shielding panel 106 will determine the shape of the area shielded or protected. Accordingly, the shape and/or dimensions of the shielding panel 106 may, in some embodiments, be selected to cover a particular defined vehicle surface region identified or envisaged. Put differently, the shielding panel 106 creates a shield zone over the defined vehicle surface region during travel of the vehicle. Whilst the shield zone does not necessarily need to shield the full defined vehicle surface region, it should at least partially shield it to avoid debris coming into contact therewith (and potentially adhering thereto).

In use, the front surface or face of the shielding panel 106 may collect debris during travel, particularly mud or the like which becomes airborne from the road. To withstand impact from heavy debris (e.g., rocks, mud, snow/ice), the weight of accumulated debris which adheres thereto; and/or the drag forces applied thereto when the vehicle is in motion, the shielding panel 106 in this embodiment is substantially rigid or resilient. In this embodiment, this robustness of the shielding panel 106 is provided by the material from which it is manufactured, as described further below, although other embodiments are also described. It should be noted, however, that the design of the shielding panel 106 should be such so as to deflect the majority of debris and/or minimize/avoid debris accumulation over time (see, for example, FIG. 14). Indeed, aerodynamic design may facilitate minimizing/avoiding debris accumulation, and/or an outer surface with a low coefficient of friction or otherwise smooth surface may facilitate this.

Figure 2:
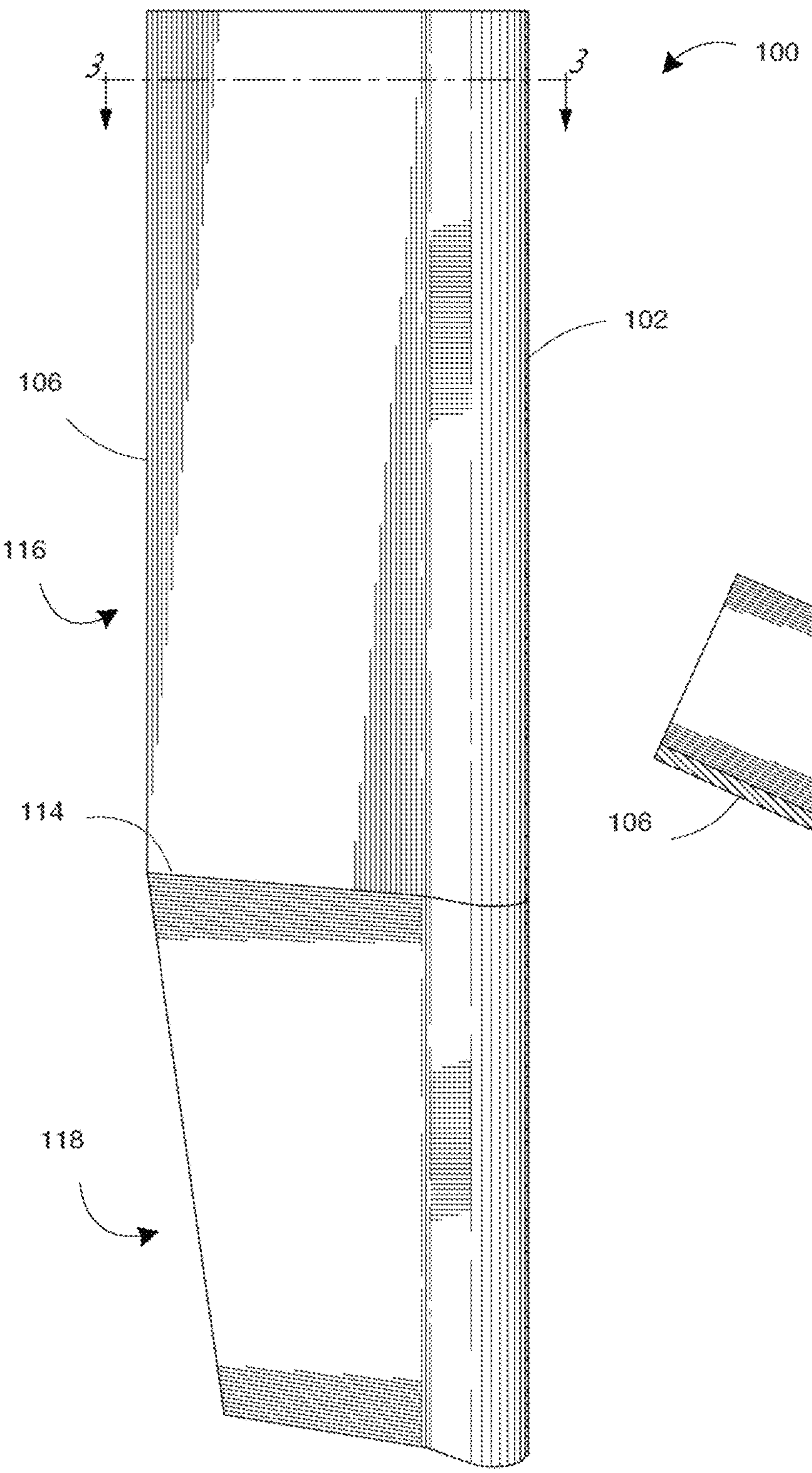
FIG. 2 is a side face view the debris deflector shown in FIG. 1, illustrating the shielding panel in further detail, and on which line 3-3 is illustrated.

In this embodiment, as shown in FIGS. 1 and 2, the shielding panel 106 defines a curvature 114 along its length, which in this embodiment extends through the width of the shielding panel 106 (or height, with respect to the vehicle surface). More specifically, in this embodiment, the curvature 114 forms an obtuse angle on a leading edge of the debris deflector 100. The curvature 114 is located on a lower portion or end of the resilient deflector body 102, thereby forming a longer upper portion 116 and a shorter lower portion 118 of the resilient deflector body 102. Notably, in this embodiment, the longer upper portion 116 is shaped and dimensioned to be positioned vertically with reference to the defined vehicle surface region and the shorter lower portion 118 is shaped and dimensioned to slant inwards from the upper portion 116 towards the defined vehicle surface region and/or slightly below it, so as to shield the defined vehicle surface region at its lower portion. Since the attachment panel 104 and the shielding panel 106 are of unitary construction in this embodiment, the attachment panel 104 follows the curvature 114 of the shielding panel 106.

As noted above, at least a portion of the attachment panel 104 is configured to correspond with a vehicle surface of the vehicle. Such configuration for correspondence with a vehicle surface may comprise any material, part or shape configuration which allows the attachment panel 104 to be attached to the vehicle surface. In this particular embodiment, the entire attachment panel 104 is configured to correspond with a vehicle surface by means of its structural flexibility or deformability, and such configuration is provided in this embodiment by the material from which it is manufactured, as described further below. Accordingly, in this embodiment, the attachment panel 104 is flexible or deformable to conform to a contour (or shape) of the vehicle surface. In this regard, it is to be appreciated that different vehicles have different shapes or curvatures, although generally convex-shaped overall, and therefore a certain level of flexibility or deformability in this embodiment (where the attachment panel 104 is adhered directly to the vehicle surface) would allow the debris deflector 100 to conform to various shapes or curvatures (i.e., without creating precise or separate debris deflector 100 for each possible vehicle).

Figure 3:
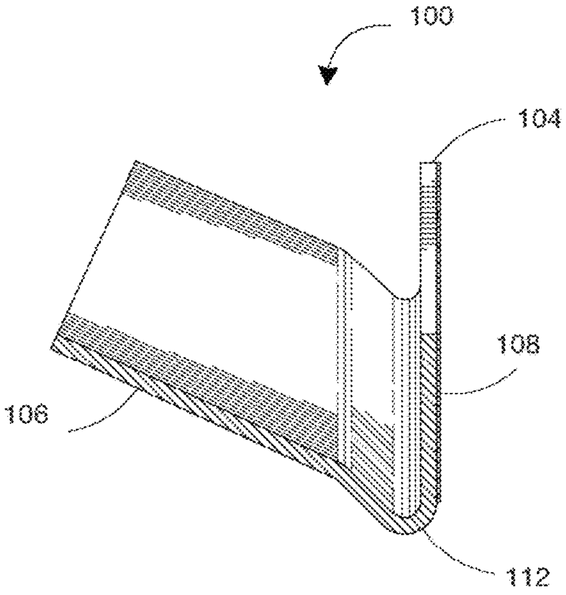
FIG. 3 is a cross-sectional view of the debris deflector shown in FIGS. 1 and 2, taken through the line 3-3 illustrated in FIG. 2.

In this particular embodiment, as shown in FIG. 1, the attachment panel 104 and the shielding panel 106 are of unitary construction. Therefore, the resilient deflector body 102 is manufactured of a single piece of material, which comprises a generally L-shaped bend 112 forming the connection between the shielding panel 106 and the attachment panel 104. In this particular embodiment, as shown in FIGS. 1 and 3, the attachment panel 104 and the shielding panel 106 are connected to one another at less than 90 degrees relative to one another, at approximately 80 degrees, thereby forming the substantially L-shape in cross section. As described above, since the attachment panel 104 is attached to the vehicle surface, this configuration leaves the shielding panel 106 at an angle of approximately 80 degrees relative to the vehicle surface.

In this embodiment, the attachment mechanism 108 comprises a removable adhesive, and particularly a pressure-sensitive non-permanent adhesive (PSNPA). The PSNPA 108 is permanently applied to a lower surface of the attachment panel 104 and allows the debris deflector 100 to be non-permanently and releasably or removably adhered to the vehicle surface. In this embodiment, the PSNPA 108 is releasable or removable from the vehicle surface without irreparably harming an outer paint layer (or other outer protective or cosmetic layer) of the vehicle. In this embodiment, the PSNPA 108 can withstand speeds of up to 200 km/hour, so as to ensure adhesion of the attachment panel 104 to the vehicle surface even at top speeds. Notably, use of the PSNPA may be advantageous, in some embodiments, since no drilling or other holes are required in the vehicle body, which would complicate installation and/or which may otherwise be prone to rust or the like. Furthermore, the use of PSNPA may allow the debris deflector 100 to be moved between locations or between vehicles, if and when needed.

Figure 4:
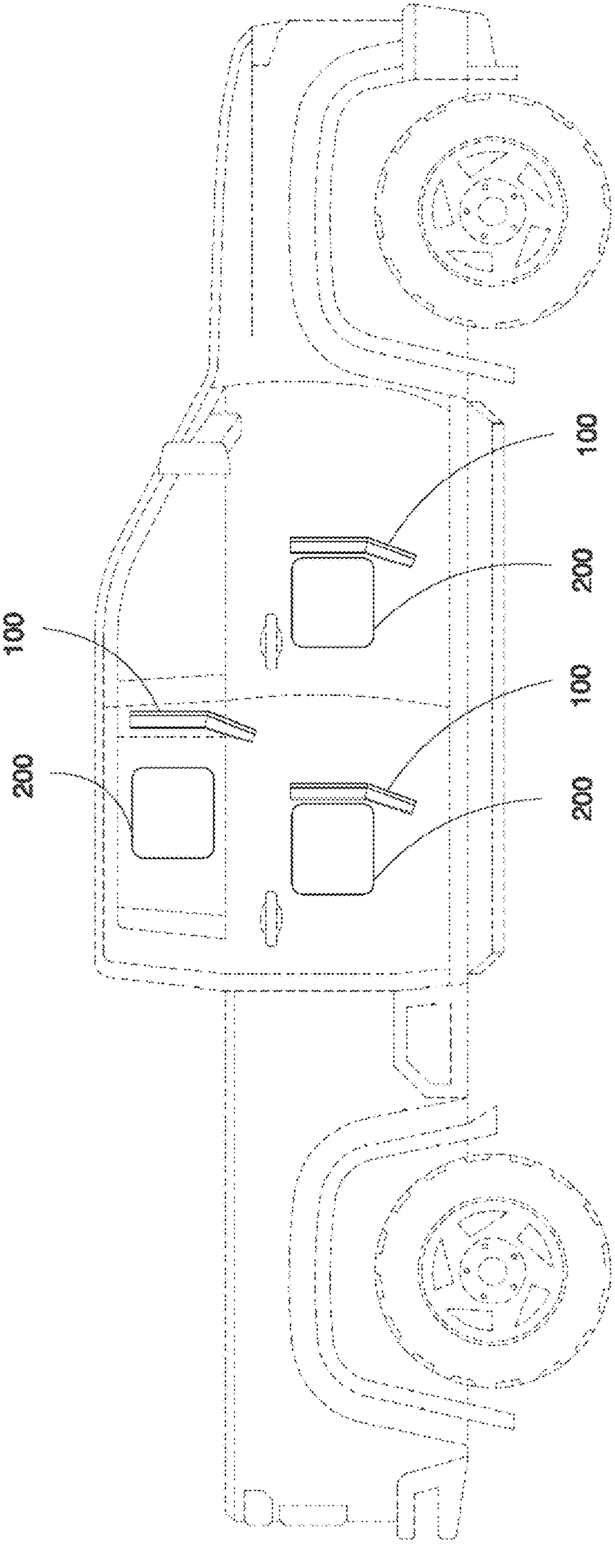
FIG. 4 is a side plan view of three of the debris deflector shown in FIGS. 1 to 3, the three debris deflectors attached to a truck at three exemplary locations, all of which are in front of different exemplary defined vehicle surface regions to be shielded from debris.

As shown in FIG. 4, the debris deflector 100 is adhered to a vehicle in use, and in this particular embodiment, the vehicle is a pickup truck. It is to be appreciated however, that the vehicle may be any road vehicle, including but not limited to any personal vehicle (for example, motorcars, motorbikes, bicycles, all-terrain vehicles), passenger vehicle (for example, taxis, buses), commercial vehicle (for example, trucks, semitrucks, load beds, trailers, gas/fuel trucks), construction vehicles (for example, excavators, bulldozers, cranes, dump trucks, front and/or back loaders), agricultural vehicles (for example, tractors, irrigation systems), service provider vehicles (for example, telecommunications vehicles, towing vehicles), delivery vehicles or the like.

In FIG. 4, three exemplary decal deflectors 100 are shown adhered to the pickup truck, at three exemplary locations in front of three defined vehicle surface regions (not specifically labelled). The first defined vehicle surface region is a side panel of the pickup truck, on the front door; the second defined vehicle surface region is also a side panel of the pickup truck but on the rear door; and the third defined vehicle surface region is a rear windowpane. In this particular embodiment, all three defined vehicle surface regions have a decal 200 applied thereto. It is to be appreciated, however, that the debris deflector 100 may be useful to shield other defined vehicle surface regions including but not limited to a side door of the vehicle, a side window of the vehicle, a door handle of the vehicle, a side air vent of the vehicle, a side advertising panel, or the like, some of which are illustrated herein. Indeed, the same debris deflector 100 could be used for several of these regions, or different embodiments could be used for different regions. Furthermore, the same debris deflector 100, such as the one in front of the rear windowpane, may serve to shield both the windowpane itself and the decal 200 applied thereto.

As mentioned above, the debris deflector 100, and specifically the shielding panel 106, is designed with specific shape and/or dimensions to at least partially shield the defined vehicle surface region. More specifically, in this embodiment, the shielding panel 106 is shaped and dimensioned to shield the decal 200 applied to the defined vehicle surface region, to avoid debris adhering thereto. This may serve to prevent debris accumulation on the defined vehicle surface region. Where the defined vehicle surface region comprises, a decal applied thereto, as in this embodiment, this would maintain visibility of the decal (or put differently, prevent the debris covering the decal at least partially). In this embodiment, the shielding panel 106 may also serve to deflect or redirect any debris away from the predefined vehicle surface region and/or decal 200. For example, the shielding panel 106 may deflect or redirect small stones away from the predefined vehicle surface region.

In this embodiment, the debris specifically comprises road debris which may adhere or which is prone to adhering to the vehicle surface. Put differently, the debris in this context comprises vehicle-adherable road debris, including mud or the like, which would potentially obscure, conceal or cover the decal 200 at the defined vehicle surface region.

In this embodiment, since the attachment panel 104 and the shielding panel 106 are of unitary construction, both are manufactured of polycarbonate. Use of polycarbonate, in this embodiment, may ensure that the debris deflector 100 is sufficiently durable for its intended usage (to withstand continuous impact from road debris and/or drag forces), whilst still being sufficiently flexible to conform to any contour(s) of the vehicle. In this embodiment, the polycarbonate is transparent so as to avoid detracting attention from the decal 200 and is specifically a high impact polycarbonate plastic to withstand even larger debris, such as rocks, colliding into the debris deflector 100.

In this embodiment, therefor, the debris deflector 100 is a retrofittable vehicle accessory which is available as an aftermarket part. As described, the debris deflector 100 may be applied to sides of the vehicle at various positions where needed or desired, which in this embodiment is on vehicle side doors and side window to shield the decals 200 applied there. As described above, the shielding of decals may be required, for example, in mining and/or construction settings, where the identity of the owner of the vehicle is readily identifiable by the decal and/or unit number, and therefore a visible and clean decal and/or unit number is mandated or preferred.

It is to be appreciated that various alternative embodiments of the debris deflector 100 are envisaged, without departing from the general nature and scope of the instant disclosure. Some of these embodiments or variations are shown in the figures provided herewith and will now be described. In particular, in FIGS. 5 to 9, 11 and 12, reference numeral 300 provides various exemplary installations or attachments of various embodiments of the debris deflector 100 as attached to various exemplary vehicles. Accordingly, these figures exemplify some of possible positioning and/or uses of various embodiments of the debris deflectors disclosed herein, and some of the possible shapes and/or dimensions of the defined vehicle surface area. Notably, whilst certain embodiments of the debris deflector 100 are shown to shield certain shapes and/or dimensions of defined vehicle surface areas (and/or decals applied thereto), it should be appreciated that these combinations are exemplary only and one debris deflector 100 embodiment may be useful to shield additional and/or alternative shapes and dimensions of defined vehicle surface areas (and/or decals applied thereto).

Figure 5:
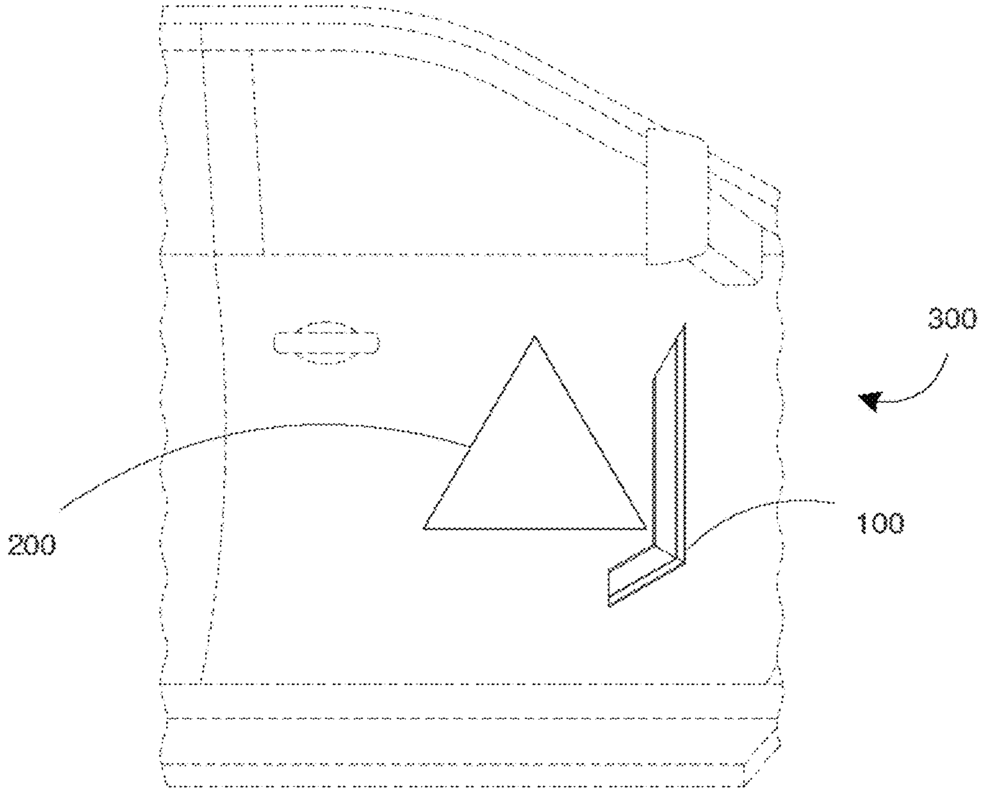
FIG. 5 is a side plan view of another embodiment of a debris deflector, as attached to a vehicle in front of a triangular-shaped decal applied to a defined vehicle surface region, this embodiment of the debris deflector having an obtuse angle on its leading edge, with a longer upper portion and a shorter lower portion.

In FIG. 5, another embodiment of the debris deflector 100 is illustrated, attached to a side door of a vehicle, in front of the defined vehicle surface area. This embodiment of the debris deflector 100 has an obtuse angle on its leading edge, with a longer upper portion and a shorter lower portion. This embodiment of the debris deflector 100 is shaped and dimensioned to shield or protect a decal 200 having a triangular shape, as shown.

Figure 6:
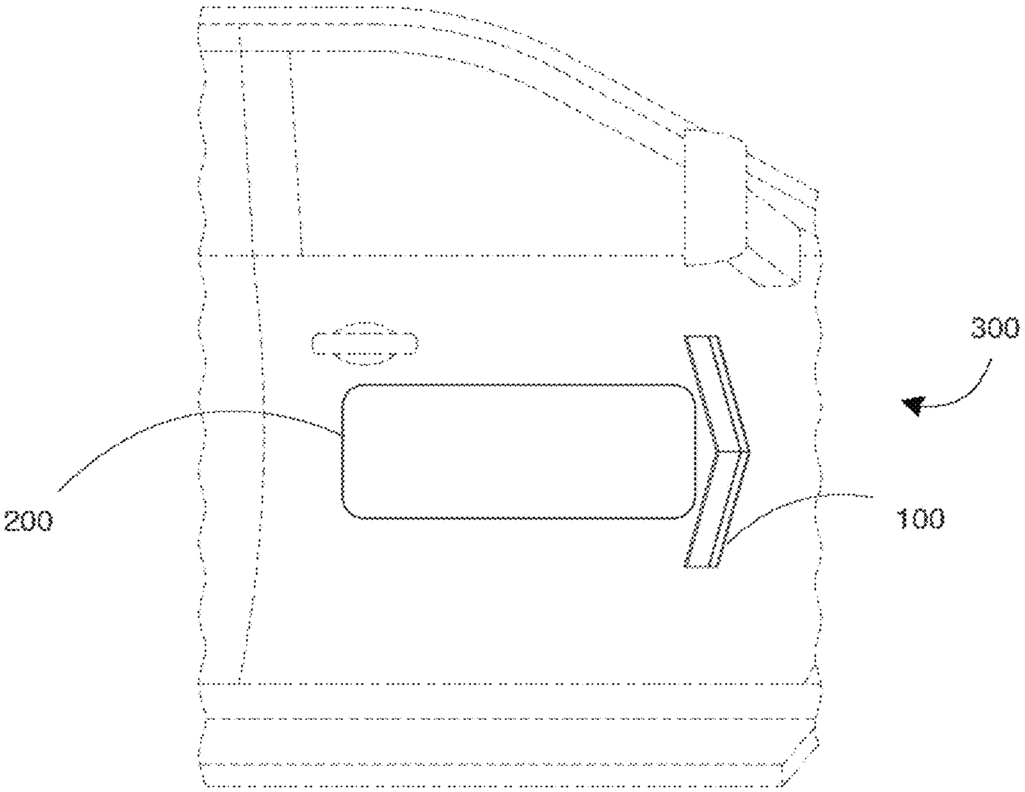
FIG. 6 is a side plan view of another embodiment of a debris deflector, as attached to a vehicle in front of an oblong-shaped decal applied to a defined vehicle surface region, this embodiment of the debris deflector having an obtuse angle on its leading edge, with an upper portion and a lower portion of equal length.

In FIG. 6, another embodiment of the debris deflector 100 is illustrated, attached to a side door of a vehicle, in front of the defined vehicle surface area. This embodiment of the debris deflector 100 has an obtuse angle on its leading edge (differing in degrees from FIG. 5), with an upper portion and a lower portion of equal length. This embodiment of the debris deflector 100 is shaped and dimensioned to shield or protect a decal 200 having an elongate rectangular or oblong shape, as shown.

Figure 7:
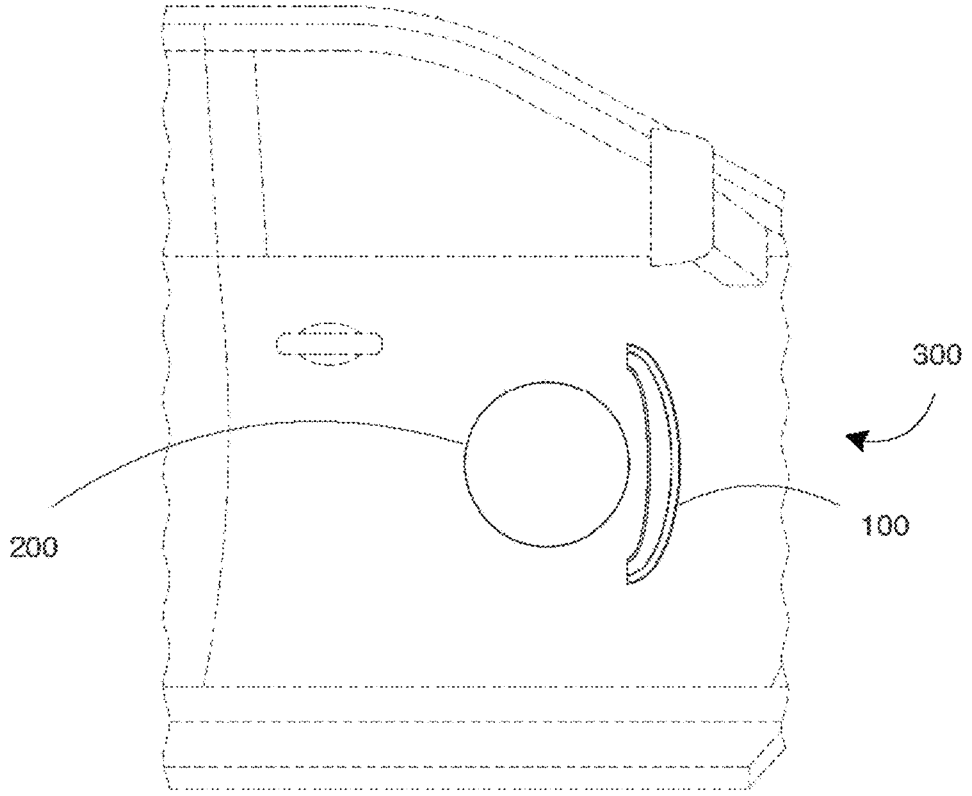
FIG. 7 is a side plan view of another embodiment of a debris deflector, as attached to a vehicle in front of a circular-shaped decal applied to a defined vehicle surface region, this embodiment of the debris deflector having an arcuate shape on its leading edge.

In FIG. 7, yet another embodiment of the debris deflector 100 is illustrated, attached to a side door of a vehicle, in front of the defined vehicle surface area. This embodiment of the debris deflector 100 has an arcuate shape on its leading edge and is shaped and dimensioned to shield or protect a decal 200 having a circular or arcuate shape, as shown.

Figure 8:
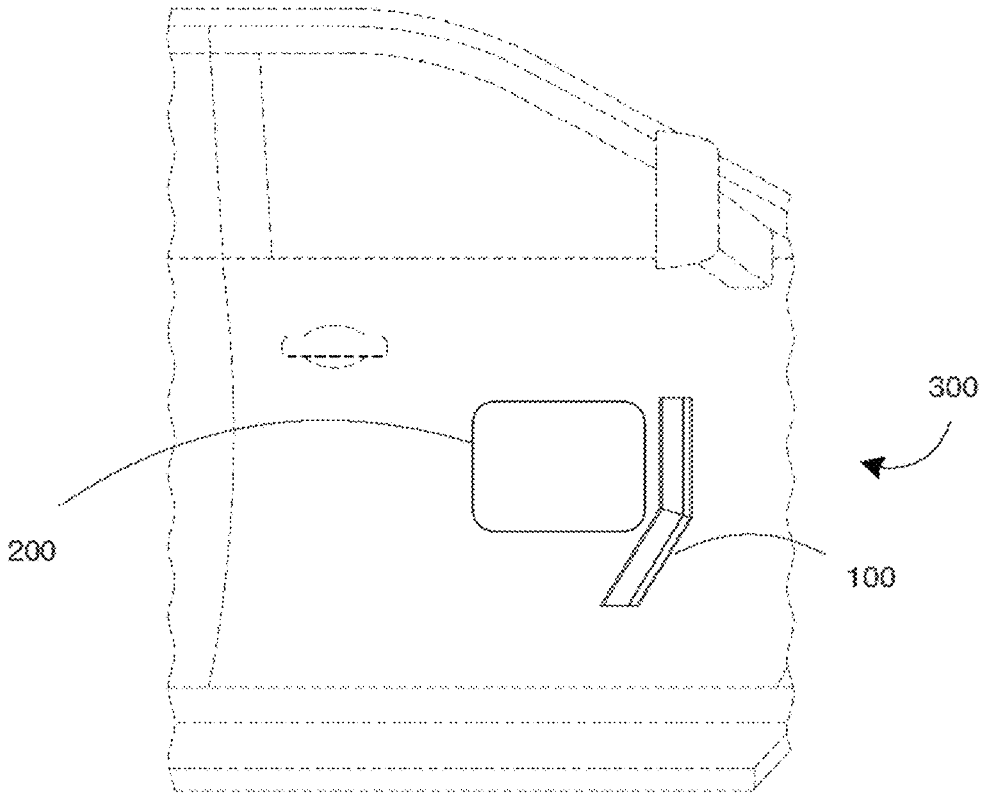
FIG. 8 is a side plan view of another embodiment of a debris deflector, as attached to a vehicle in front of an oblong-shaped decal applied to a defined vehicle surface region, this embodiment of the debris deflector having an obtuse angle on its leading edge, with a shorter upper portion and a longer lower portion.

In FIG. 8 yet a further embodiment of the debris deflector 100 is illustrated, attached to a side door of a vehicle, in front of the defined vehicle surface area. This embodiment of the debris deflector 100 has an obtuse angle on its leading edge (differing in degrees compared to FIGS. 5 and 6), with a shorter upper portion and a longer lower portion. This embodiment of the debris deflector 100 is shaped and dimensioned to shield or protect a decal 200 having an oblong shape, as shown. As described with reference to FIGS. 1 to 3, the lower portion may be useful to protect the decal 200 applied to the defined vehicle surface area from road debris, in particular, which is flung upwards from the vehicle wheels.

Figure 9:
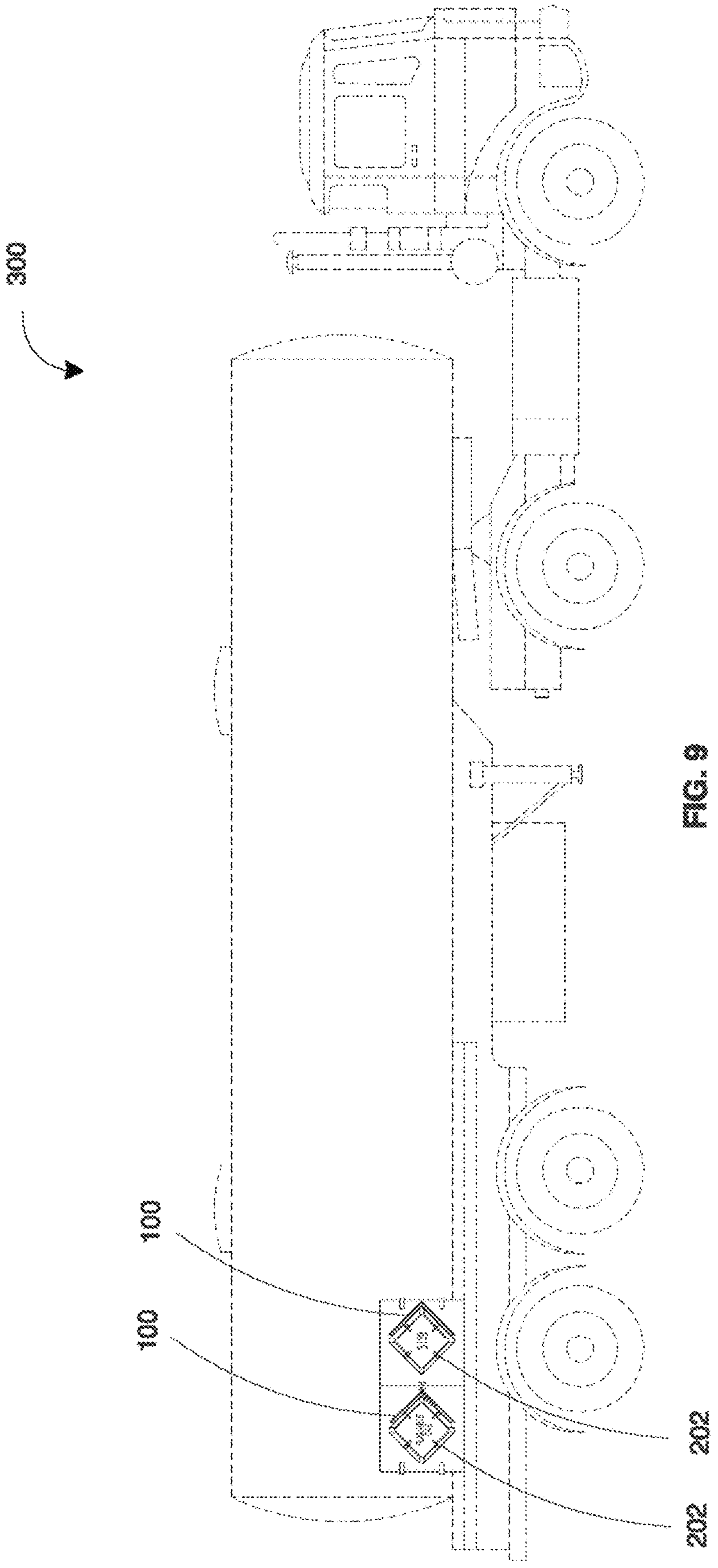
FIG. 9 is a side plan view of two of other embodiments of a debris deflector, as attached to a tanker truck in front of two hazardous material (hazmat) placards applied to a defined vehicle surface region, this embodiment of the debris deflector having a 270 degree angle on its leading edge, with an upper portion and a lower portion of equal length.

In FIG. 9, another embodiment of a debris deflector 100 is illustrated, attached to a side of a gas/fuel tanker at its rear end, in front of the defined vehicle surface area. This embodiment of the debris deflector 100 has a 270-degree angle on its leading edge (a 90 degree angle on its trailing edge), to shield or protect the hazmat placards 202 applied to the defined vehicle surface area from debris. As noted above, keeping these hazmat placards 202 clean and/or free of debris may be important from a safety perspective and may even be legally mandated. Yet further, it is notable that the debris deflector 100 does not obstruct or in any manner interfere with the visibility of the hazmat placards 202, therefore ensuring that use of the debris deflector 100 does not contravene any legal display requirements for transporting dangerous goods. The hazmat placards 202 may include notification that the goods carried (for example, gas or fuel) is dangerous, flammable, explosive, corrosive, toxic or the like.

Figure 10:
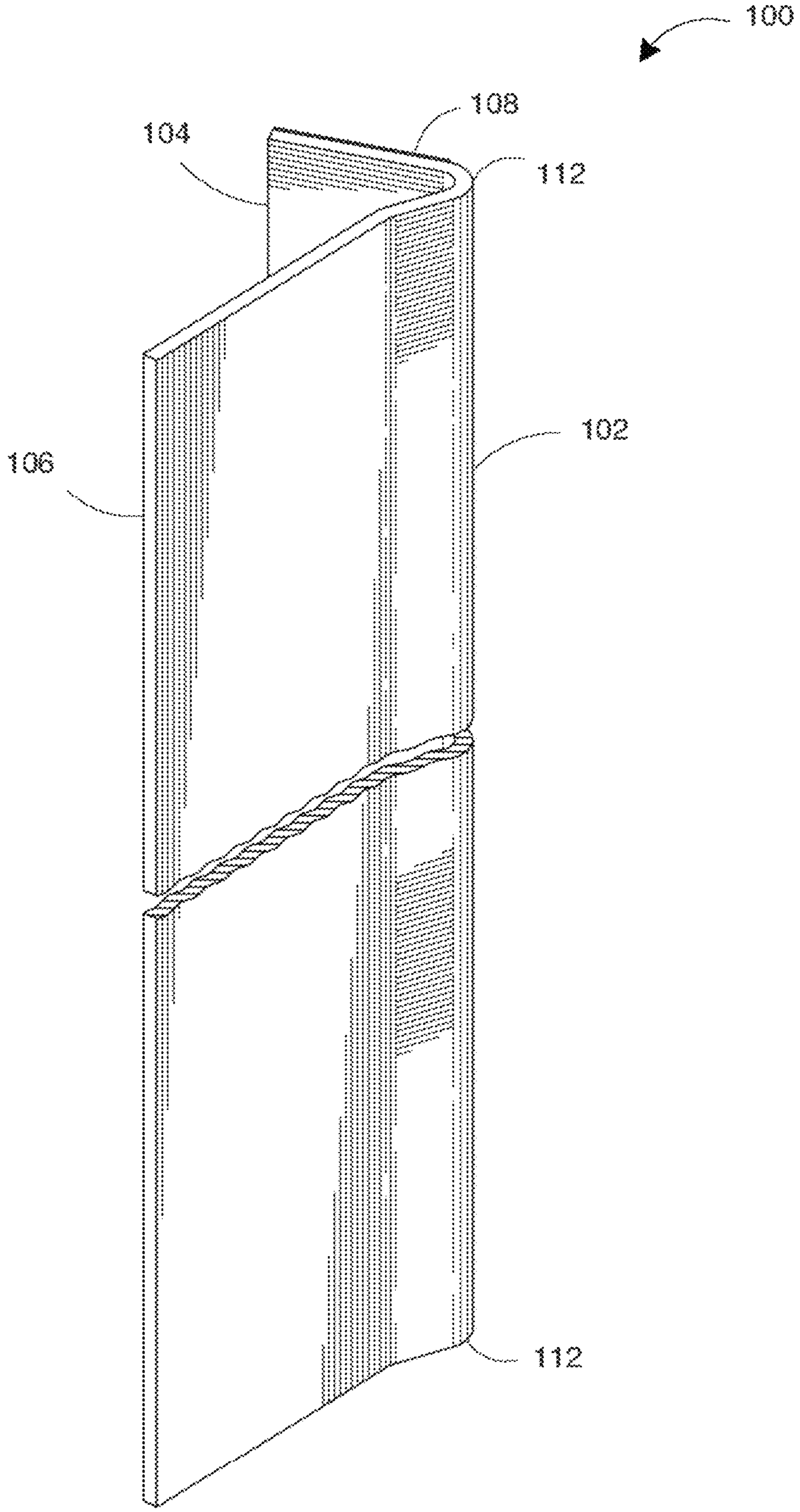
FIG. 10 is a side perspective view of yet another embodiment of a debris deflector, having an elongate resilient deflector body and a substantially planar leading edge.

In FIG. 10, yet another embodiment of a debris deflector 100 is illustrated, which has an elongate resilient deflector body 102. It is to be appreciated that the debris deflector 100 of FIG. 10 does not include a curvature along the length thereof (such as the curvature 114 shown in FIGS. 1 to 3), nor indeed separately identifiable upper and lower portions at different angles (such as vertical upper portion 116 and slanting lower portion 118 in FIGS. 1 to 3). This debris deflector 100 of FIG. 10 thus has a planar leading edge. As indicated, the debris deflector 100 may have any length, which is typically suited to the defined vehicle surface region to be shielded and/or the particular vehicle on which the debris deflector 100 is intended to be used. Similarly, the shielding panel 106 may be of any width (or height with reference to the vehicle surface) so as to shield at least a portion of or otherwise the entire defined vehicle surface region in a lengthwise direction.

Figure 11:
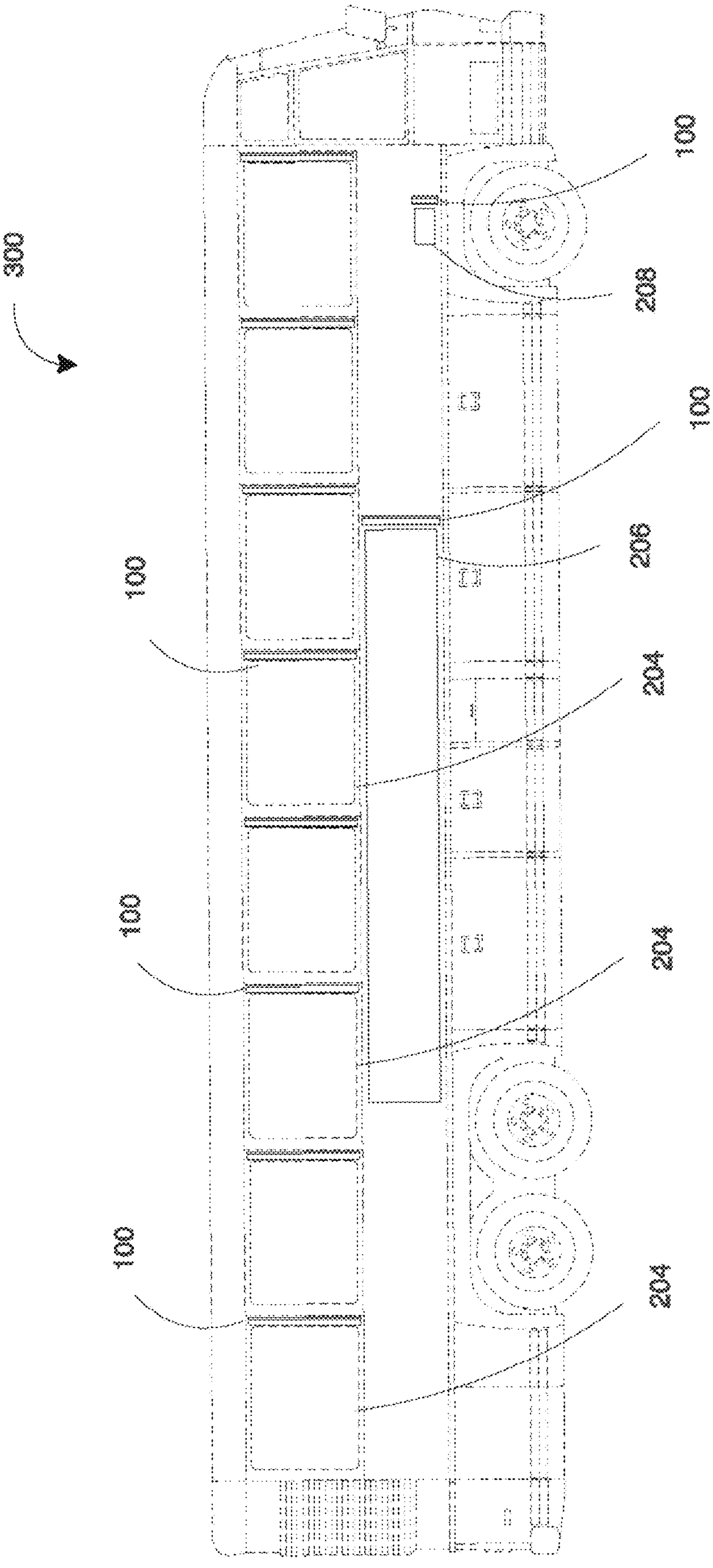
FIG. 11 is a side plan view of the debris deflector shown in FIG. 10, as attached to a bus at various exemplary locations in front of defined vehicle surface regions including bus windows, bus advertising and a bus identifier.

In FIG. 11, several instances of the embodiment of the elongate debris deflector 100 shown in FIG. 10, are illustrated as being attached to an exemplary bus. In this example, different embodiments of the defined vehicle surface region are illustrated, including: bus side windows 204 arranged in a parallel row, a bus advertising panel 206 located along the middle of the bus and a bus identifier 208 located towards the front of the bus, adjacent the bus door. As shown, each debris deflector 100 is attached in front of each defined vehicle surface region and specifically, in front of each bus window 204, the bus advertising panel 206 and the bus identifier 208, in order to deflect oncoming airborne debris away from these regions. This may be useful to avoid debris accumulation over time (for example, dust, soot, mud), ensuring that bus passengers have unobstructed vision through bus windows 204, that bus advertising 206 remains visible during runs, and/or that the bus identifier 208 remains visible even in adverse weather and/or road conditions.

Figure 12:
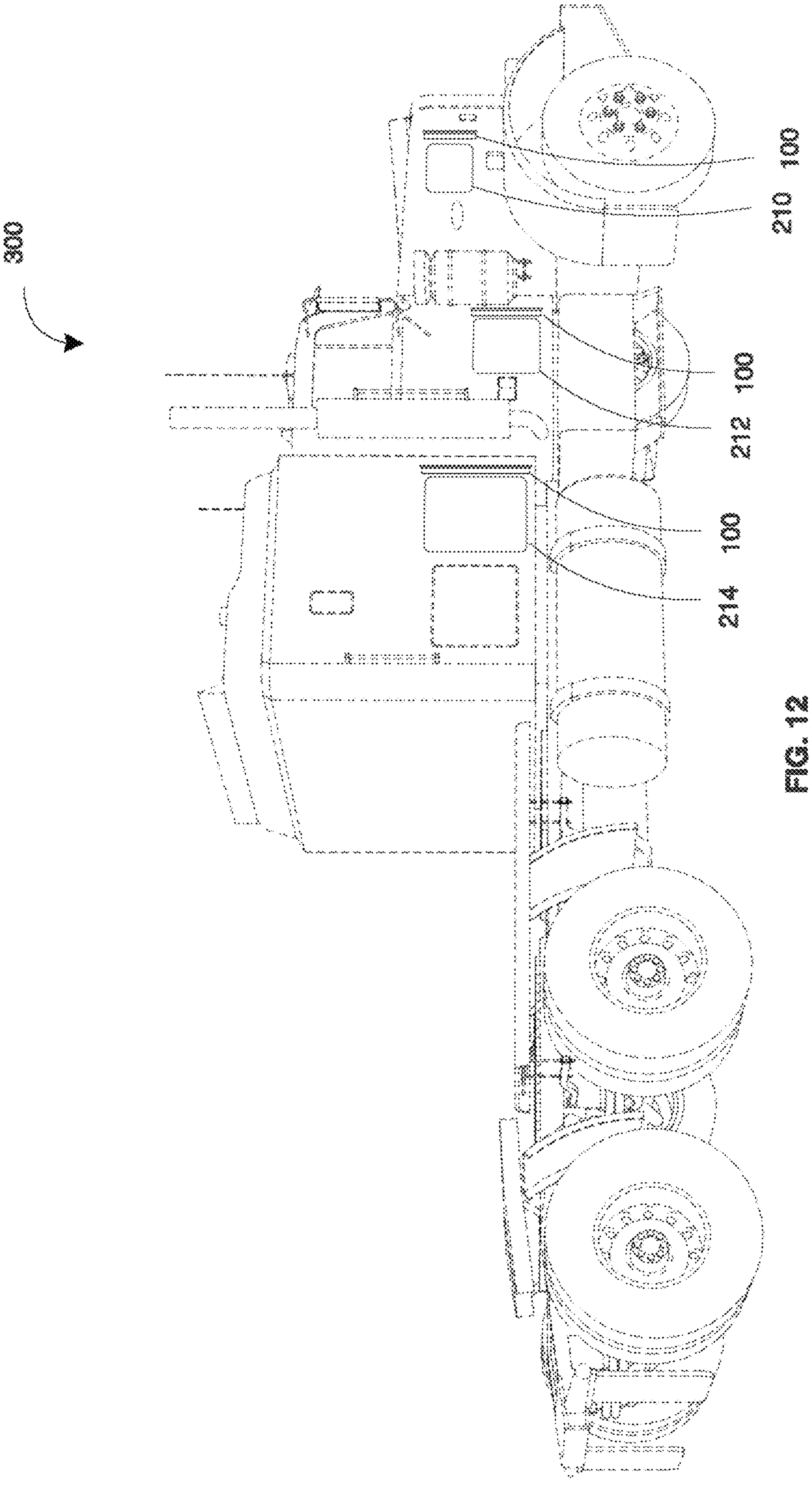
FIG. 12 is a side plan view of the debris deflector shown in FIG. 10, as attached to a truck at various exemplary locations in front of defined vehicle surface regions including a truck identifier, a company logo and a hazmat placard.

In FIG. 12, several further instances of the embodiment of the debris deflector 100 shown in FIG. 10, are illustrated as being attached to an exemplary truck. In this example, different embodiments of the defined vehicle surface region are illustrated, including: a truck identifier 210 on the front side panel, a company logo decal 212 on the truck door and a truck refrigeration notice 214 on the rear panel of the truck. As shown, each debris deflector 100 is attached in front of each defined vehicle surface region and specifically, in front of the truck identifier 210, the company logo 212 and the truck refrigeration notice 214, in order to deflect oncoming airborne debris away from these regions. This may be useful to avoid debris accumulation over time, ensuring that the truck identifier 210 and/or the truck refrigeration notice 214 remain clearly visible to comply with the law, and/or that the truck company logo 212 remains visible on site to comply with site regulations, without requiring repeated cleaning of these regions.

Figure 13:
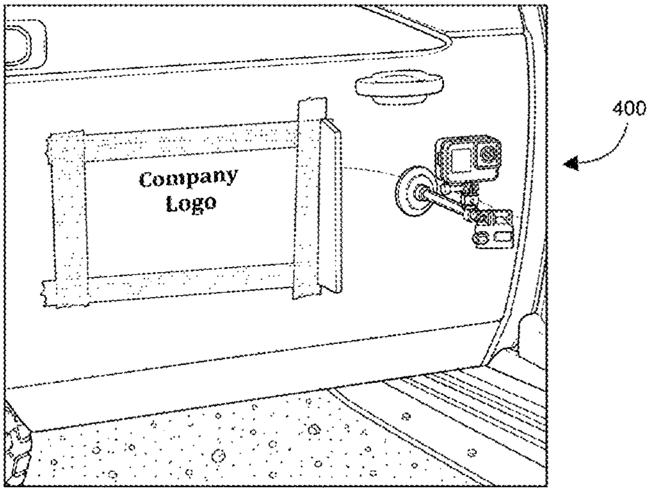
FIG. 13 is a photograph of a debris deflector, in accordance with one embodiment which largely reflects the debris deflector shown in FIG. 10, shown attached to an exemplary vehicle in front of a defined vehicle surface region at the start of an illustrative experiment.
Figure 14:
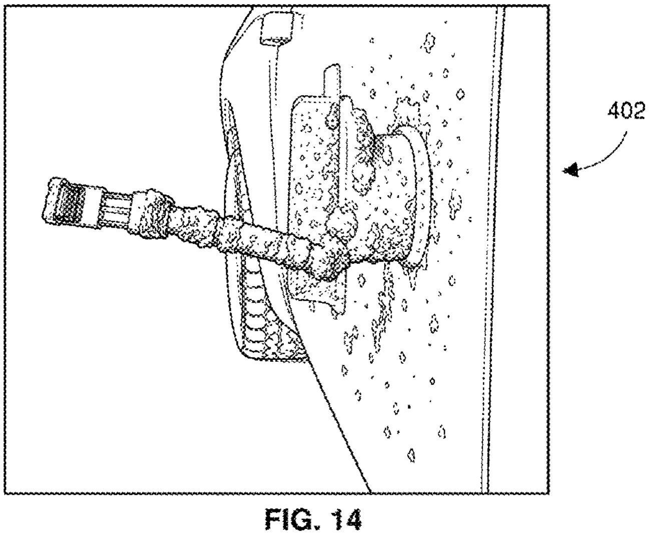
FIG. 14 is a photograph of the debris deflector of FIG. 13 during the illustrative experiment, illustrating the road conditions and vehicle-adherable road debris which becomes airborne during travel.
Figure 15:
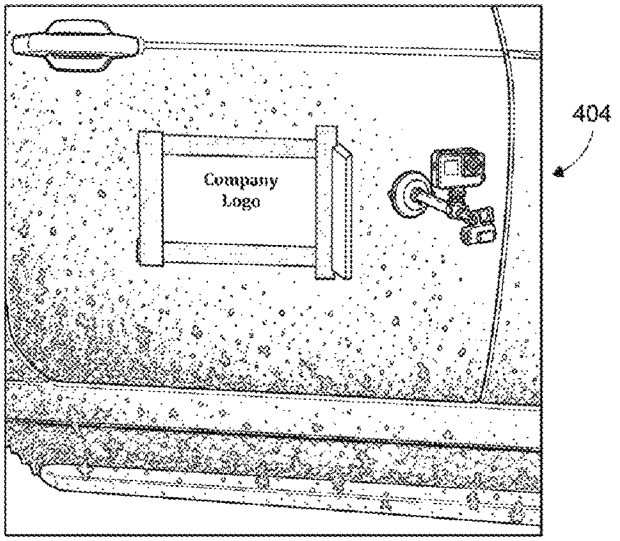
FIG. 15 is a photograph of the debris deflector of FIGS. 13 and 14 after the illustrative experiment, illustrating that the defined vehicle surface region is at least partially free of the vehicle-adherable road debris.

In FIGS. 13 to 15, a set of photographs illustrate an exemplary experiment conducted to portray the efficiency of one embodiment of the debris deflector 100, the shape of which largely reflects the debris deflector 100 shown in FIG. 11. This experiment was carried out by the inventor in Fort McMurray, Alberta, Canada, on a dirt road after an average amount of rainfall the previous day. The vehicle used for the experiment was a pickup truck, and a camera set (shown forward of the debris deflector) was used to capture images and video during the experiment. The vehicle surface on which the debris deflector 100 was to be attached was initially cleaned of any debris or the like (see FIG. 13). This testing location was selected as it is this area of the vehicle on which decals are typically applied, particularly company logos.

FIG. 13 specifically shows at 400 the debris deflector 100 as attached to the pickup truck after cleaning the vehicle surface, and before driving anywhere. As shown, the debris deflector 100 was simply attached to the vehicle surface using heavy duty brown packing tape, overlaying the attachment panel 104 and adhering to the vehicle surface by adhesion forces. Notably, the debris deflector 100 was specifically placed in front of the defined vehicle surface region to be shielded. A clean, white piece of paper (non-glass, 8.5×11 inches) with the exemplary wording "Company Logo" printed thereon was then taped behind the debris deflector 100, to represent the defined vehicle surface region and/or a decal applied thereto.

FIG. 14 shows at 402 the road conditions present at the time of conducting the experiment-wet and muddy. After 5 minutes of driving on this dirt road at approximately 50 km/hour, a substantial amount of road debris (mud and dirt) had become airborne by the motion of the vehicle wheels and had adhered to the vehicle body along the length of the side of the pickup truck. Accordingly, the airborne road debris present was clearly vehicle-adherable, and a large portion thereof adhered to and accumulated on the front side of the shielding panel 106, as shown in FIG. 14.

FIG. 15 shows the result after the illustrative experiment. As shown at 404, the white paper (in effect, defined vehicle surface region and/or decal) is at least partially free of the vehicle-adherable road debris which otherwise adhered to the vehicle surface. Indeed, the piece of paper is almost entirely free of debris, despite the vehicle surface around the paper being covered in a layer of mud, and the wording printed on the piece of paper remains legible. As shown, the length of the debris deflector 100 was sufficient to shield the piece of paper along its full height, and the width of the debris deflector 100 was sufficient to shield the piece of paper along its full length. FIGS. 13 to 15 may therefore at least partially illustrate the efficiency of the debris deflector 100 in shielding the defined vehicle surface region from debris coming into contact therewith and/or potentially adhering thereto, which once adhered, would possibly obscure, conceal or cover the defined vehicle surface region. Accordingly, in some embodiments, the debris deflector 100 may be useful, in some embodiments, to keep such defined surface vehicle regions substantially free or clear of adherable debris, so that any information, graphics or the like displayed thereon can remain visible and/or legible (at least for a longer period of time, ideally for a much longer period of time).

Based on various experiments conducted with exemplary embodiments of the debris deflector 100, as well as the experiment described with reference to FIGS. 13 to 15, the structure and/or design of the debris deflector 100 was adjusted and/or improved over time. Indeed, a fair amount of experimentation, requiring time and effort, was required by the inventor to reach the subject matter disclosed herein. The inventor tested a plethora of different shapes, dimensions, materials, attachment mechanisms (including different adhesives) and/or modes of use of the debris deflector 100. Notably, as alluded to above, it was not possible to simply make use of an existing vehicle accessory for the need(s) described herein, as at least major modification was required to reach the debris deflector 100 disclosed herein, as well the related methods and kits (described further hereunder).

It is to be appreciated that yet further alternative embodiments of the debris deflector 100 are envisaged, without departing from the general nature and scope of the instant disclosure, which are not specifically illustrated in the figures. Some of these embodiments or variations are briefly described hereunder, without limitation.

It is to be appreciated, for example, that other shapes and/or dimensions of the debris deflector are envisaged in other embodiments, not all of which are explicitly described herein but are nonetheless intended to fall within the scope of the instant disclosure.

In other embodiments, the attachment panel 104 and the shielding panel 106 may not be connected to one another directly but instead the resilient deflector body 102 may include further panels or parts which are interposed between the shielding panel 106 and the attachment panel 104. In other embodiments, the attachment panel 104 and the shielding panel 106 may be separate components entirely, being connected by one or more fasteners, hinges or the like. In different embodiments, the attachment panel 104 and the shielding panel 106 are connected to one another at 90 degrees or less.

As the attachment panel 104 and the shielding panel 106 may be separate components entirely, in other embodiments these panels may be manufactured of different materials. For example, the shielding panel 106 may be manufactured of polyurethane and the attachment panel 104 may be manufactured of acrylic (other material options described below).

In one embodiment, the resilient deflector body 102 may include one or more hinges between the shielding panel 106 and the attachment panel 104, such that the shielding panel 106 is adjustable between an upright position for use (to shield the defined vehicle body region) and a lowered position which can be used when shielding is not required. In some embodiments, the one or more hinges may include a pivot along the length of the connection between the shielding panel 106 and the attachment panel 104, and a releasable hinge lock arranged thereon.

In other embodiments, the debris deflector 100 may be shaped and dimensioned to be aerodynamic during movement of the vehicle, thereby improving fuel efficiency (as compared to a flat or not aerodynamic version). Typically, the shielding panel 106 which extends away from the vehicle surface is designed to be aerodynamic. For example, in one embodiment, a height of the shielding panel 106 may comprise a curvature to render the shielding panel 106 aerodynamic. In other embodiments, the position of the shielding panel 106 relative to the vehicle surface may be sufficient to render it aerodynamic. In yet other embodiments, the shielding panel 106 may comprise other shaping, louvers or vents to improve airflow and/or decrease drag.

In other embodiments, the attachment panel 104 itself may be flexible or deformable to conform to a contour of the vehicle surface and/or to different vehicle surfaces. Put differently, instead of the resilient deflector body 102 being flexible or deformable in its entirety, in some embodiments only the attachment panel 104 may be of such a nature, to allow the debris deflector 100 to be attached to various different shapes or curvatures of different vehicles. In yet other embodiments, the attachment mechanism 108 itself (for example, adhesive layer) may provide the flexibility or deformability to conform to the contour of the vehicle surface(s). In some specific implementations, the attachment panel 104 or attachment mechanism 108, as the case may be, may be specifically designed and/or customized to accommodate different vehicle door shapes (for example, different door ridges, creases or pinches), or different vehicle body parts (for example, different vehicle window frames and/or casings). Notably, the debris deflector 100 may be customizable like any other retrofit part, to suit a particular application and/or user requirements.

In some embodiments, the debris deflector 100 may further comprise a resilient pad which is arranged or arrangeable between the attachment panel 104 and the adhesive 108, the resilient pad forming part of the attachment mechanism and providing a level of conformity and/or scratch resistance to the debris deflector 100 upon attachment to a vehicle. For example, the resilient pad may be in the form of a rubber or silicon layer of a thickness which readily conforms to a vehicle surface.

In other embodiments, the attachment panel 104 may comprise spaced apart leg panels, such as two legs on either end of the shielding panel 106, or the like, which support the shielding panel 106 in an upright position (away from the vehicle surface) and attach the shielding panel 106 to the vehicle surface. Notably, the attachment panel 104 need not extend along the full length of the shielding panel 106.

In other embodiments, the shape and/or dimensions of the shielding panel 106 may be selected so as to shield the defined vehicle surface region identified or envisaged which may be different in different embodiments. In other embodiments, the shielding panel 106 may be shaped and dimensioned to shield a window from airborne debris, to prevent fouling or damage. In yet other embodiments, the shielding panel 106 may be shaped and dimensioned to shield a vehicle door handle (for example, on a service truck) from airborne debris, to prevent fouling or damage. Indeed, the defined vehicle surface region to be protected may take any shape and/or form, and therefore complimentary shapes and/or dimensions of the shielding panel 106 are envisaged to sufficiently shield same from debris coming into contact therewith during travel.

In other embodiments, the shielding panel 106 may include a lip edge which extends or projects generally outwards from the vehicle surface. Indeed, in one embodiment, if the attachment panel 104 is generally flush with the vehicle surface (in use), the shielding panel 106 may extend away from the vehicle surface but towards the rear of the vehicle, and the lip edge may extend away from the vehicle surface but at a generally 90-degree angle to the vehicle surface. This lip edge may extend along the length of the shielding panel 106. Notably, regardless of configuration, this lip edge may in some embodiments aid in improving the aerodynamics of the debris deflector 100 by, for example, reducing the downforce applied.

In other embodiments, any one or both of the upper portion and lower portion may include tapered ends.

In other embodiments, the upper and/or lower portions of the debris deflector 100, which are separated by a bend (for example, with an obtuse angle or right angle on the leading edge) may themselves include inward curvatures. For example, in one embodiment, a lower portion of the debris deflector 100 which is intended to be arranged generally beneath a vehicle surface region to be shielded may include an upwards and/or inwards curvature on its outermost edge of the lower portion (shielding panel 106 and optionally, attachment panel 104). This curvature may in use be positioned to shield the furthest end of the vehicle surface region, particularly from debris which may become airborne from vehicle wheels or the road surface (as opposed to oncoming debris) and therefore may come from a direction which is more beneath or behind the vehicle surface region. In some embodiments, the upper and/or lower portions of the debris deflector 100 are not linear but include curvatures or shaping suited to the particular application.

In some embodiments, a lower portion of the debris deflector 100 may be shaped and dimensioned to extend beneath the vehicle surface region to be shielded (optionally including a decal applied thereto) to shield at least a part of, or otherwise the full length of, the vehicle surface region. It is to be appreciated, for example, that particularly muddy driving surfaces may cause large amounts of debris to be airborne, such that protection along the full length of the vehicle surface region (or decal) would be advantageous. In some embodiments, the debris deflector 100 may comprise a right angle, wherein the upper portion shields the height of the vehicle surface region (or decal) and the lower portion extends beneath the vehicle surface region to shield at least a portion, if not all, of the length of vehicle surface region (or decal).

Notably, whilst the upper and lower portions are generally described as such, in some embodiments, such as the one described directly above having two portions which are perpendicular to one another, the terms “upper” and “lower” are to be understood broadly and in context. Furthermore, in some embodiments, such as where the debris deflector 100 has a curved body shape, clearly distinct upper and lower portions need not be defined or structurally distinct.

In other embodiments, the front surface or face of the shielding panel 106 may comprise ribs or other structural or textual features to enhance adhesion of debris to the shielding panel 106. For example, the front surface or face of the shielding panel 106 may comprise grooves or ribs for such purposes. In other embodiments, the attachment mechanism 106 may comprise double-sided automotive tape, or the like. In other embodiments, the attachment mechanism 106 may comprise an automotive adhesive known in the art. The adhesive may be a removable adhesive which does not leave a residue on the vehicle surface. In other embodiments, the attachment mechanism 106 may comprise an arrangement of non-permanent hook-and-loop style fasteners. In one exemplary embodiment, the attachment mechanism 106 may comprise the removable and damage-free Command® brand adhesive strips manufactured and sold by 3M®.

In other embodiments, the attachment mechanism 108 may comprise a non-permanent adhesive which withstand speeds of less than 200 km/hour, for example up to 80 km/hour, where in such embodiments, users are expected to remove the debris device 100 prior to driving the vehicle at speeds in excess of the upper limit. Such lower bond strength may be useful, for example, where the vehicle will be driving in residential areas only, or confined construction zones where high speeds are not expected.

In other embodiments, the attachment mechanism 108 may comprise a permanent adhesive. The permanent adhesive may ensure that the debris deflector 100 is permanently attached to the vehicle surface without risk of detachment during, for example, travel at high speed. The permanent adhesive may be in form of a permanent adhesive tape or strips applied to the bottom surface of the attachment panel 104.

In some embodiments, such as where the attachment mechanism 106 comprises an adhesive or tape, the attachment mechanism 106 is temperature resistant within a predefined temperature range such that separation of the debris deflector 100 from the vehicle in extreme cold or hot is avoided.

In other embodiments, the attachment mechanism 108 may comprise one or more magnetic strips arranged on the surface of the attachment panel 104 to be adhered to the vehicle. Such magnetic strips may be useful to attach the debris deflector 100 to vehicles having side panels manufactured of materials which are not aluminum, carbon fiber or polymer.

In other embodiments, the attachment mechanism 108 may comprise one or more fasteners arranged so as to fasten the attachment panel 104 to a panel or surface of the vehicle body. For example, the one or more fasteners may include screws, nuts and bolts, rivets, clips, staples or the like. In yet other embodiments, the attachment mechanism may comprise any mounting formation and/or members suitable for the purpose of attaching the debris deflector 100 to the relevant vehicle surface.

In one embodiment, the attachment mechanism 108 comprises attachment members configured to attach the debris deflector 100 to a surface-mounted structure. For example, the attachment mechanism 108 may comprise one or more clips, presses, or studs, which are positioned on the debris deflector 100 to attach it to a hazard or hazmat placard or its integral shield. Typically, such placards are manufactured of plastic, metal or other material capable of withstanding weather exposure, and are attached to external vehicle surfaces. In some instances, placards are placed within placard holders for exchange thereof depending on hazardous materials being carried. Accordingly, in various embodiments, the attachment mechanism 108 comprises attachment members (e.g., clips) configured to attach the debris deflector 100 to the placard itself or otherwise the placard holder or frame, without limitation.

In other embodiments, only one of the attachment panels 104 and the shielding panel 106 may be manufactured of polycarbonate. In other embodiments, any one or both of the attachment panel 104 and the shielding panel 106 may be manufactured of different material(s) entirely, including, for example, acrylic, plastic, carbon fiber, aluminum, polyurethane, rubber, silicon or the like, to name but a few. In some embodiments, any one or both of the attachment panel 104 and the shielding panel 106 may be manufactured of mouldable material(s). Notably, the material(s) selected should provide the attachment panel 104 and/or the shielding panel 106 with sufficient durability for its intended usage, and/or should provide sufficient temperature resistance within an acceptable temperature range. Yet further, in other embodiments, the attachment panel 104 and the shielding panel 106 may be of a selected colour and/or finish. For example, in some embodiments, the debris device 100 (or a component thereof) may have a black matte finish to match the other finishings or the like on the vehicle. In other embodiments, the debris device 100 (or a component thereof) may be transparent or colored. In some embodiments, the color of the debris device 100 may be customized to a particular vehicle color. In some embodiments, the debris deflector 100 may be specifically designed to be aesthetically pleasing and/or aesthetically cohesive with the rest of a particular vehicle or type of vehicle.

In some embodiments, the debris deflector 100 may be 3D printed, moulded by any suitable technique, or the like, being manufactured in its usable form.

In one embodiment, the debris deflector 100 may be manufactured as a strip, having a plurality of cut-out placeholders (or notches) spaced apart along the length of the strip. The cut-out placeholders may be generally triangular shaped and may generally define a plurality of positions along the length of the strip at which the strip can be optionally cut, and folded or bent to define the upper and lower portions. As such, the debris deflector 100 in such embodiments is manufactured of a flexible material such that it can be folded or bent at any one of those positions to define upper and lower portions of differing lengths. In use, for example, a user may cut out or remove the placeholder which is best suited to the shape and/or dimensions of a particular vehicle surface (or decal) to be shielded. The plurality of cut-out placeholders may be marked with labels, ink or the like, may be perforated to assist in removal, or otherwise may be demarcated with other means. In other embodiments, other implementations allowing selectable positioning of a fold or bend in the debris deflector 100 body may be workable.

In another embodiment, the debris deflector 100 may be provided as a strip, which can be cut into an appropriate length, or into a plurality of appropriate lengths, forming the basis for one or more debris deflectors 100. For example, the strip may be in the form of a generally triangular-shaped rubberized strip (i.e., triangular or filled-V shape in cross-section), with one side thereof forming the attachment panel 104 and another forming the shielding panel 106. The strip may be folded, bent, or curved, to the appropriate shape for the decal or vehicle surface region to be shielded.

In other embodiments, the debris deflector 100 may further comprise a vehicle surface overlay panel (or "decal surface"). Generally, the vehicle surface overlay panel is positioned behind the shielding panel 106, where the vehicle surface (or decal) to be shielded is or would be positioned. When the debris deflector 100 includes the vehicle surface overlay panel, the vehicle surface overlay panel itself forms the defined vehicle surface region (i.e., region to be at least partly shielded from debris). In use, the vehicle surface overlay panel provides a surface on which a decal can be applied or adhered. In some embodiments, the vehicle surface overlay panel may be attached to the attachment panel 104, whereas in other embodiments, the vehicle surface overlay panel is coterminous or forms an extended part of the attachment panel 104, without limitation. In some embodiments, the vehicle surface overlay panel is formed from a flexible material (e.g., thin plastic, silicon, rubber, or the like) that is capable of moulding to an exterior surface of a vehicle. In some embodiments, the vehicle surface overlay panel may have the decal printed or otherwise marked thereon, the debris deflector 100 being manufactured with the decal already applied or visible. For example, a debris deflector with the vehicle surface overlay panel may be manufactured or supplied with a hazard placard or company logo applied thereto-requiring only a single installation thereof.

In other embodiments, the debris deflector 100 may comprise one or more additional stabilizer components which stabilize, for example, the shielding panel 106 in its position. For example, additional stabilizer components may comprise a strut (rod or bar), a gusset or the like, arranged between the back surface of the shielding panel 106 and the top surface of the attachment panel 104, which resists compression of the shielding panel 106 during vehicle travel caused by drag. In other embodiments, the shielding panel 106 may have reinforcement members which reinforce the shielding panel 106 so as to withstand drag force in use. For example, reinforcement members may comprise reinforcing ribs spaced apart along the length of the shielding panel 106, optionally extending across the width of the shielding panel 106.

In other embodiments, the debris deflector 100 or at least the shielding panel 106 may have a telescopic mechanism which allows the length thereof to be adjustable to suit different heights of decals, for example, or different sizes of defined vehicle surface regions. Indeed, in other embodiments, other length adjusting mechanisms may be workable including, for example, lengths of panel which may be connected together to form the shielding panel 106.

In other embodiments, the debris deflector 100 may be provided by a manufacturer at the sale of the vehicle, the attachment mechanism 108 being permanently attached to the vehicle, for example. In other embodiments, the debris deflector 100 may be provided together with or attached to a hazmat placard or similar structure attachable to a vehicle.

Other embodiments of the debris deflector 100 may be attachable to any one of the following non-limiting vehicle examples: construction (including welding, pipeline, and communications), oil and gas, farming, delivery, rental, and towing, as well as government fleet vehicles. In yet other embodiments, the vehicle may be any other non-road vehicles, such as boats (for example, commercial fishing vessels, speed boats, canoes, kayaks), planes or the like. In other embodiments, the vehicle may be a trailer, as noted, and the debris deflector may be attached to any position forward of a part/indicium to be shielded from debris.

Accordingly, the various embodiments of the debris deflector 100 disclosed herein may share the functionality of being able to shield or protect a defined vehicle surface region (such as a decal applied to a vehicle door, or another placard attached to the vehicle) from vehicle-adherable airborne debris during predominantly forward movement of the vehicle (certain embodiments may also protect the vehicle from debris during rearward travel). Various shapes and/or dimensions may achieve this functionality, specific shapes and/or dimensions may provide advantages over others (for example, improved shielding capability or reduced drag/downward force), and indeed various parts of the debris deflector 100 may be shaped and/or dimensioned accordingly.

Although not specifically shown, in accordance with another exemplary embodiment, a debris deflector kit will now be described. In particular, another embodiment of the disclosure provides for a kit of at least a pair of debris deflectors which are provided together and which are intended to be used together on a vehicle. The pair of debris deflectors may be intended, for example, to be used on opposing sides of the vehicle to shield decals on opposing side doors. Therefore, the pair of debris deflectors may be mirroring images of one another, with one designed for attachment to a left side door and the other for the attachment to the right-side door. The debris deflectors may be in the form or type of any of the embodiments disclosed herein or otherwise falling within the scope if the instant disclosure, and indeed, may be of different forms or types. In this particular embodiment, each debris deflector includes adhesive previously applied to the attachment panel, which can be used to adhere each debris deflector to the vehicle.

In other embodiments, the debris deflector kit may comprise four debris deflectors, intended to be used, for example, to shield decals and/or hazmat notifications at four different locations on a truck or lorry. In yet other embodiments, the debris deflector kit may comprise ten or more debris deflectors, intended to be used, for example, in front of windows of a bus, minivan or the like, to avoid debris build up on the windows. Indeed, the number and/or type of debris deflectors in the kit may be variable depending on the intended application. For example, a double tanker semi may require 12 debris deflectors, including a window visor type debris deflector and a plurality of hazmat placard types, without limitation.

In embodiments where the attachment mechanism is separate from the resilient deflector body, the debris deflector kit may further include sufficient attachment mechanism (for example, fasteners, screws, adhesive, or the like) to attach each of the debris deflectors to the vehicle and may optionally include replacement attachment mechanism(s). For example, where non-permanent adhesive is provided as part of the kit, separate to the debris deflector(s), additional non-permanent adhesive may be provided as part of the kit to allow for multiple or repeated applications of the debris deflector(s) to the vehicle over time, thereby providing several uses.

Also not specifically shown, but in accordance with a further exemplary embodiment of the instant disclosure, there is provided a method of shielding a defined vehicle surface region of a vehicle from vehicle-adherable airborne debris during travel will now be described. The method comprises attaching a debris deflector, having at least a shielding panel and attachment mechanism, to the vehicle. The debris deflector is attached at a position forward of the defined vehicle surface region to be shielded (relative to the direction of travel), such that the vehicle-adherable airborne debris is prevented from coming into contact with (and potentially adhering to or damaging or otherwise impacting the visible integrity of) the defined vehicle surface region during travel of the vehicle.

In this particular embodiment, the debris deflector comprises a debris deflector as described above, with reference to any one or more of FIGS. 1 to 15. It is to be appreciated, however, that other embodiments of the debris deflector may be workable with the method.

In some embodiments, the method comprises a preliminary step of orientating the debris deflector in a substantially vertical orientation in front of the defined vehicle surface region to be shielded. Notably, such substantial vertical orientation may serve to shield the full height of the defined vehicle surface region to be protected. The orientation of the debris deflector may be more angled, in other embodiments, provided it creates behind it the shield zone which at least partially covers the defined vehicle surface region. Indeed, in some embodiments, as described herein, the debris deflector itself may comprise an angle, and therefore orientation of such embodiments of the debris deflector during the method may vary according to the shape and/or dimensions of the debris deflector.

In some embodiments, where the attachment mechanism comprises adhesive, for example, the step of attaching the debris deflector comprises adhering the debris deflector to the vehicle by means of either a pressure-sensitive non-permanent adhesive or a permanent adhesive. In other embodiments, other adhesives may be workable. Indeed, other attachment mechanism may be workable in other embodiments, as described above.

In this particular embodiment, the debris deflector at least partially shields a decal applied to the defined vehicle surface region when the debris deflector is attached to the vehicle. In other embodiments, however, the debris deflector may at least partially shield a window, a door handle, an air vent, a hazmat placard, a vehicle identifier, advertising or the like.

In some embodiments, the kit may further comprise one or more decals to be applied to the vehicle. For example, the kit may include a first debris deflector designed to shield or protect a first decal when both are applied to a vehicle, the first debris deflector being positioned in front of the first decal, with the shape of the first debris deflector being complementary to the first decal so as to shield at least a portion thereof from oncoming airborne road debris (which would other potentially conceal or cover the first decal) when the vehicle is travelling in a forward direction.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are intended to be encompassed by the present claims. Moreover, no requirement exists for a device, method or kit to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A debris deflector for shielding a defined vehicle surface region of a vehicle from airborne debris during travel, comprising a resilient deflector body which comprises at least:

an attachment panel, at least a portion of which is configured to correspond with a vehicle surface;

a shielding panel, at least a portion of which is configured to extend away from said vehicle surface when said attachment panel is attached thereto;

wherein said shielding panel defines a curvature along its length such that said shielding panel shields the defined vehicle surface region at both a front side and a lower side, in use; and an attachment mechanism provided on said attachment panel for attaching the debris deflector to the vehicle at a position forward of the defined vehicle surface region, so as to prevent the airborne debris from coming into contact with the defined vehicle surface region.

2. The debris deflector of claim 1, wherein said shielding panel and said attachment panel are connected to one another at 90 degrees or less.

3. The debris deflector of claim 1, wherein said shielding panel and said attachment panel are of unitary construction.

4. The debris deflector of claim 1, wherein said shielding panel forms any one of: an obtuse angle, a right angle or an arcuate shape, along its leading edge.

5. The debris deflector of claim 1, wherein said shielding panel is substantially elongate for attachment to the vehicle in a substantially vertical orientation.

6. The debris deflector of claim 1, wherein said attachment panel is flexible to conform to a contour of said vehicle surface.

7. The debris deflector of claim 1, wherein the defined vehicle surface region comprises any one of: a side panel, a side door, a side window, a door handle, an air vent, a side advertising panel, or a hazmat placard, of the vehicle.

8. The debris deflector of claim 1, wherein said attachment mechanism comprises a pressure-sensitive non-permanent adhesive.

9. The debris deflector of claim 1, wherein any one or both of: said shielding panel and said attachment panel, is manufactured of polycarbonate or rubber.

10. The debris deflector of claim 1, wherein the defined vehicle surface region comprises a decal applied thereto.

11. The debris deflector of claim 10, wherein the airborne debris comprises vehicle-adherable road debris and wherein said vehicle-adherable road debris would at least partially conceal said decal upon adhering thereto.

12. The debris deflector of claim 1, further comprising a vehicle surface overlay panel positioned behind said shielding panel and forming the defined vehicle surface region to be shielded.

13. A method of shielding a defined vehicle surface region of a vehicle from vehicle-adherable airborne debris during travel, comprising a preliminary step of orientating a debris deflector in a substantially vertical orientation in front of the defined vehicle surface region;

attaching said debris deflector, having at least a shielding panel, by means of an attachment mechanism to the vehicle, at a position forward of the defined vehicle surface region to be shielded, such that the vehicle-adherable airborne debris is prevented from coming into contact with the defined vehicle surface region during travel of the vehicle.

14. The method of claim 13, wherein said attaching of said debris deflector comprises adhering said debris deflector to the vehicle by means of either a pressure-sensitive non-permanent adhesive or a permanent adhesive.

15. The method of claim 13, wherein the defined vehicle surface region comprises any one of: a side panel, a side door, a side window, a door handle, an air vent, a side advertising panel, or a hazmat placard, of the vehicle.

16. The method of claim 13, wherein the defined vehicle surface region comprises a decal applied thereto, and wherein the vehicle-adherable airborne debris would at least partially conceal said decal upon adhering thereto.

17. The method of claim 13, wherein said debris deflector comprises a resilient deflector body forming said shielding panel and further forming an attachment panel, at least a portion of which is configured to correspond with a vehicle surface.

* * * * *